US012323862B2

(12) United States Patent
Zhou et al.

(10) Patent No.: US 12,323,862 B2
(45) Date of Patent: Jun. 3, 2025

(54) INDIVIDUAL CELL SIGNALING FOR L1/L2 INTER-CELL MOBILITY

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 17/833,630

(22) Filed: Jun. 6, 2022

(65) Prior Publication Data

US 2023/0397056 A1    Dec. 7, 2023

(51) Int. Cl.
*H04W 36/00*    (2009.01)
*H04W 24/08*    (2009.01)

(52) U.S. Cl.
CPC ....... *H04W 36/0058* (2018.08); *H04W 24/08* (2013.01); *H04W 36/0061* (2013.01)

(58) Field of Classification Search
CPC ............. H04W 24/08; H04W 36/0055; H04W 36/0058; H04W 36/0061; H04W 36/0069; H04W 36/00835; H04W 36/0085; H04W 36/36
USPC ....................................................... 370/329
See application file for complete search history.

(56) References Cited

U.S. PATENT DOCUMENTS

| 2021/0385702 A1 | 12/2021 | Damnjanovic et al. |
| 2022/0014983 A1 | 1/2022 | Zhou et al. |
| 2023/0354109 A1* | 11/2023 | Damnjanovic ... H04W 36/0055 |
| 2023/0362853 A1* | 11/2023 | Kung ................ H04W 74/0833 |

FOREIGN PATENT DOCUMENTS

WO    2018131956 A1    7/2018

OTHER PUBLICATIONS

Huawei et al.: "Updated Views on Rel-18 Mobility Enhancements", 3GPP TSG RAN Meeting #93-e, RP-212277, Mobile Competence Centre, 650, Route Des Lucioles, F-06921 Sophia-Antipolis Cedex, France, vol. TSG RAN, No. Electronic Meeting, Sep. 13, 2021-Sep. 17, 2021, Sep. 6, 2021, 7 Pages, XP052049551, figure 2.

(Continued)

*Primary Examiner* — Robert J Lopata
(74) *Attorney, Agent, or Firm* — Arent Fox, LLP

(57) ABSTRACT

Example implementations include a method, apparatus and computer-readable medium of wireless communication by a user equipment, comprising receiving a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set. The implementations further include measuring signals from each cell of the configured cell set according to the measurement configuration. Additionally, the implementations further include transmitting a measurement report including measurement information based on the signals measured from each activated cell of the configured cell set.

30 Claims, 23 Drawing Sheets

(56) References Cited

OTHER PUBLICATIONS

International Search Report and Written Opinion—PCT/US2023/066541—ISA/EPO—Jul. 7, 2023.
Qualcomm Incorporated: "L1/L2 Mobility Overview", 3GPP TSG-RAN WG2 Meeting #114-e, R2-2105354, Mobile Competence Centre, 650, Route Des Lucioles, F-06921 Sophia-Antipolis Cedex, France, vol. Ran WG2, No. Electronic, May 19, 2021-May 27, 2021, May 11, 2021, 4 Pages, XP052006989, paragraph 2, figure 2, L1/L2 Inter-Cell Mobility Schemes, figure 2 3 Conclusion, paragraph [02.2].
Zte: "Email Discussion Summary for [RAN-R18-WS-eMBB-ZTE]", 3GPP TSG RAN REL-18 Workshop, RWS-210548, Mobile Competence Centre, 650, Route Des Lucioles, F-06921 Sophia-Antipolis Cedex, France, vol. RAN WG3, No. e-Meeting, Jun. 28, 2021-Jul. 2, 2021, Jun. 25, 2021, 35 Pages, XP052029021, paragraph [03.3] - paragraph [0004], p. 9.

* cited by examiner

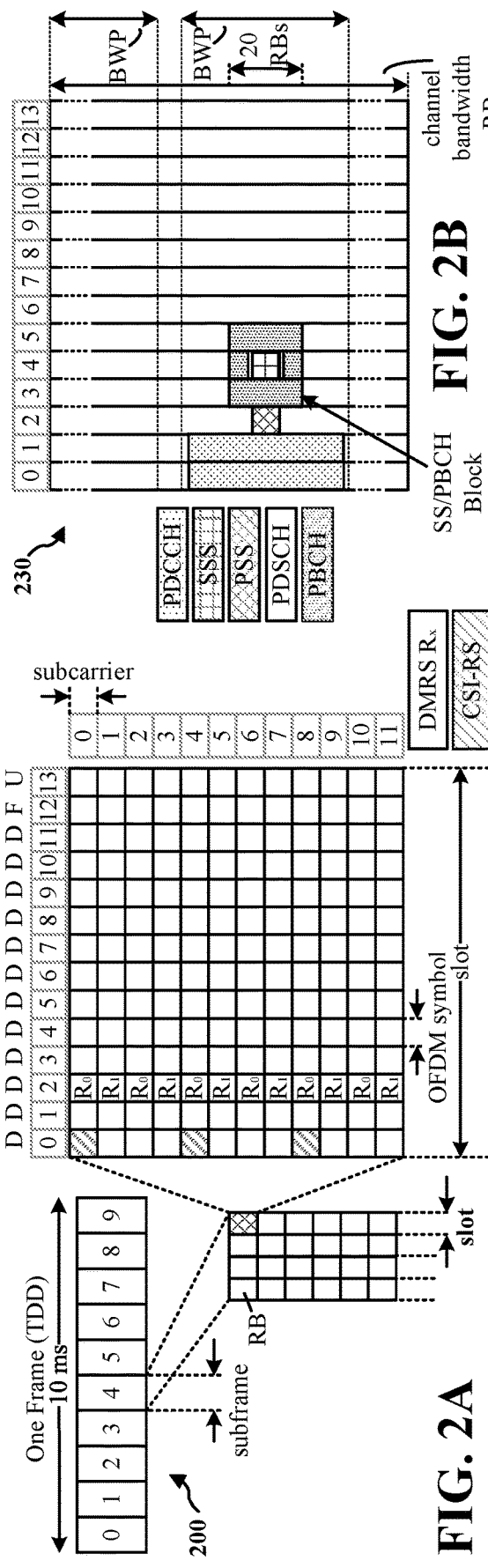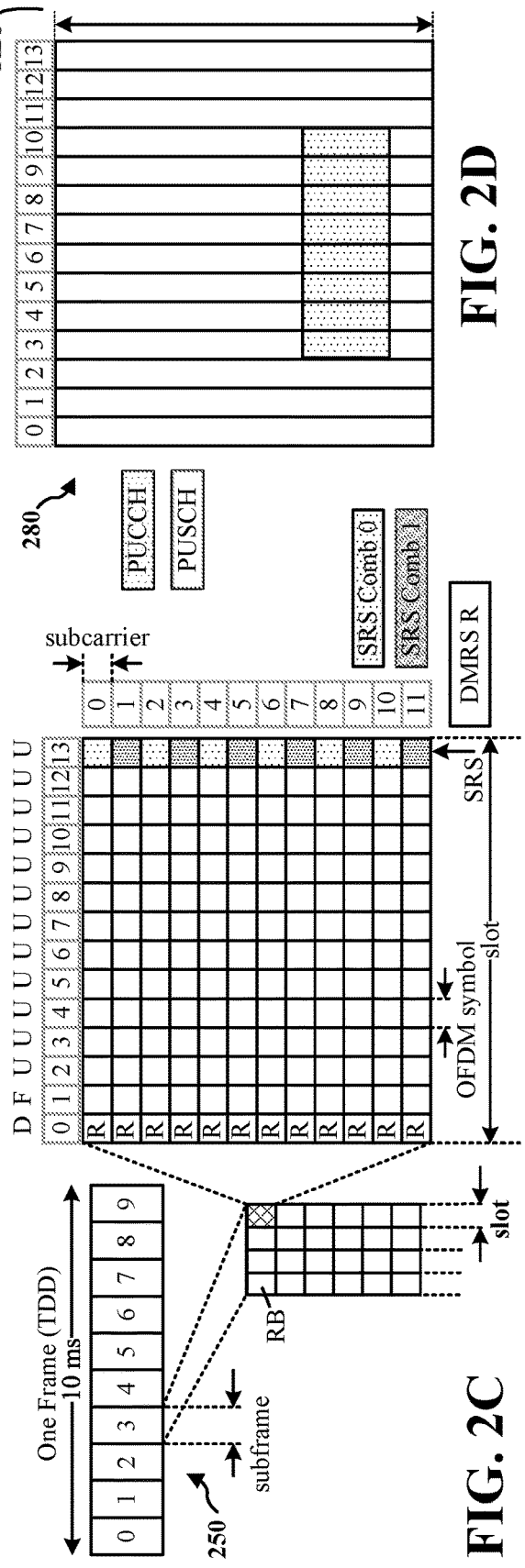
FIG. 2A
FIG. 2B
FIG. 2C
FIG. 2D

```
500b
        503
CellGroupConfig ::=       SEQUENCE {
    cellGroupId                 CellGroupId,
    rlc-BearerToAddModList      SEQUENCE (SIZE(1..maxLC-ID)) OF RLC-BearerConfig              OPTIONAL,   -- Need N
    rlc-BearerToReleaseList     SEQUENCE (SIZE(1..maxLC-ID)) OF LogicalChannelIdentity        OPTIONAL,   -- Need N
    mac-CellGroupConfig         MAC-CellGroupConfig                                           OPTIONAL,   -- Need M
    physicalCellGroupConfig     PhysicalCellGroupConfig                                       OPTIONAL,   -- Need M
    spCellConfig                SpCellConfig                                                  OPTIONAL,   -- Need M
    sCellToAddModList           SEQUENCE (SIZE (1..maxNrofSCells)) OF SCellConfig             OPTIONAL,   -- Need N
    sCellToReleaseList          SEQUENCE (SIZE (1..maxNrofSCells)) OF SCellIndex              OPTIONAL,   -- Need N
    ...
}
505
   SCellConfig ::=        SEQUENCE {
       sCellIndex                SCellIndex,
       sCellConfigCommon         ServingCellConfigCommon                      OPTIONAL,       -- Cond SCellAdd
       sCellConfigDedicated      ServingCellConfig                            OPTIONAL,       -- Cond SCellAddMod
       ...
   }

ServingCellConfig ::=  SEQUENCE {
       L1L2MobilityConfig        L1L2MobilityConfig       OPTIONAL,
       ...
   }
           501
507
```

FIG. 5B

```
L1L2MobilityConfig ::=
    reconfigurationWithSync
    rlf-TimersAndConstants
    rlmInSyncOutOfSyncThreshold
}
```

```
SEQUENCE{
ReconfigurationWithSync
SetupRelease { RLF-TimersAndConstants }
    ENUMERATED {n1}}
```

FIG. 5C

```
L1L2MobilityConfig ::= SEQUENCE{
    spCellConfig        SpCellConfig        OPTIONAL, --Cond SCell
    sCellConfig         SCellConfig         OPTIONAL, --Cond spCell
}
```

FIG. 5D

```
CellGroupConfig ::=         SEQUENCE {
  ...
  sCellToReleaseList               SEQUENCE (SIZE (1..maxNrofSCells)) OF SCellIndex    OPTIONAL,  -- Need N
  sCellL1L2MobilityToReleaseList   SEQUENCE (SIZE (1..maxNrofSCells)) OF SCellIndex    OPTIONAL
}
```

500f → 545 (sCellL1L2MobilityToReleaseList), 546

FIG. 5F

| c1 | c2 | c3 | c4 | c5 | c6 | c7 | c8 | c9 | c10 |
|---|---|---|---|---|---|---|---|---|---|
| 1 | 0 | 0 | 1 | 0 | 0 | 0 | 0 | 0 | 0 |

```
CellGroupConfig ::=    SEQUENCE {
...
sCellToReleaseList              SEQUENCE (SIZE (1..maxNrofSCells)) OF SCellIndex           OPTIONAL,  -- Need N
sCellL1L2MobilityToReleaseList  SEQUENCE (SIZE (1..maxNrofSCellsL1L2Mobility)) OF sCellL1L2MobilityIndex    OPTIONAL
}
```

500h → ; 545 → sCellL1L2MobilityToReleaseList ; 547 → sCellL1L2MobilityIndex

Receiving, via an L1/L2 message and based on the measurement report, an activation update configuration indicating at least one of a first cell of the configured cell set as being changed from a respective primary cell to a respective secondary cell, or a second cell of the configured cell set as being changed from a respective secondary cell to a respective primary cell

804

Switching use of configuration information for communicating with the at least one of the first cell or the second cell based on the activation update configuration, including switching from use of a respective primary cell configuration for the first cell to a respective secondary cell configuration for the first cell, or switching from use of a respective secondary cell configuration for the second cell to a respective primary cell configuration for the second cell

An L1/L2 mobility configured cell set, and wherein measuring signals from each cell of the configured cell set includes measuring signals from deactivated cells within the L1/L2 mobility configured cell set.

Receiving the L1/L2 mobility configuration within a serving cell configuration.

Transmitting, to a user equipment (UE), a Layer 1/Layer 2 (L1/L2) mobility configuration for each cell in a configured cell set, wherein the L1/L2 mobility configuration identifies a primary cell configuration for each secondary cell in the configured cell set, a secondary cell configuration for each primary cell in the configured cell set, and a measurement configuration for each cell in the configured cell set;

1304

Receiving a measurement report including measurement information based on signals measured by the UE from each activated cell of the configured cell set according to the measurement configuration;

1306

Generating, based on the measurement report, an activation update configuration indicating at least one of a first cell of the configured cell set as being changed from a respective primary cell to a respective secondary cell, or a second cell of the configured cell set as being changed from a respective secondary cell to a respective primary cell

1308

Transmitting, via an L1/L2 message, the activation update configuration

Switching use of configuration information for communicating with the UE based on the activation update configuration, including switching from use of a respective primary cell configuration for the first cell to a respective secondary cell configuration for the first cell, or switching from use of a respective secondary cell configuration for the second cell to a respective primary cell configuration for the second cell

FIG. 14

INDIVIDUAL CELL SIGNALING FOR L1/L2 INTER-CELL MOBILITY

BACKGROUND

Technical Field

The present disclosure generally relates to communication systems, and more particularly, to cell signaling for inter-cell mobility.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

There exists a need for further improvements in 5G NR technology. These improvements may also be applicable to other multi-access technologies and the telecommunication standards that employ these technologies. For instance, improvements to efficiency and latency relating to mobility of user equipments (UEs) communicating with network entities are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication by a user equipment, comprising receiving a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set. The method further includes measuring signals from each cell of the configured cell set according to the measurement configuration. Additionally, the method further includes transmitting a measurement report including measurement information based on the signals measured from each activated cell of the configured cell set.

Another example aspect includes an apparatus for wireless communication by a user equipment, comprising a memory and a processor coupled with the memory. The processor is configured to receive a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set. The processor is further configured to measure signals from each cell of the configured cell set according to the measurement configuration. Additionally, the processor further configured to transmit a measurement report including measurement information based on the signals measured from each activated cell of the configured cell set.

Another example aspect includes an apparatus for wireless communication by a user equipment, comprising means for receiving a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set. The apparatus further includes means for measuring signals from each cell of the configured cell set according to the measurement configuration. Additionally, the apparatus further includes means for transmitting a measurement report including measurement information based on the signals measured from each activated cell of the configured cell set.

Another example aspect includes a computer-readable medium comprising stored instructions for wireless communication by a user equipment, wherein the instructions are executable by a processor to receive a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set. The instructions are further executable to measure signals from each cell of the configured cell set according to the measurement configuration. Additionally, the instructions are further executable to transmit a measurement report including measurement information based on the signals measured from each activated cell of the configured cell set.

An example aspect includes a method of wireless communication by a network entity, comprising transmitting, to a user equipment (UE), a Layer 1/Layer 2 (L1/L2) mobility configuration for each cell in a configured cell set, wherein the L1/L2 mobility configuration identifies a primary cell configuration for each secondary cell in the configured cell set, a secondary cell configuration for each primary cell in the configured cell set, and a measurement configuration for each cell in the configured cell set. The method further includes receiving a measurement report including measurement information based on signals measured by the UE from each activated cell of the configured cell set according to the measurement configuration. Additionally, the method further includes generating, based on the measurement report, an activation update configuration indicating at least one of a first cell of the configured cell set as being changed from a respective primary cell to a respective secondary cell, or a second cell of the configured cell set as being changed from a respective secondary cell to a respective primary cell. Additionally, the method further includes transmitting, via an L1/L2 message, the activation update configuration.

Another example aspect includes an apparatus for wireless communication by a network entity, comprising a memory and a processor coupled with the memory. The processor is configured to transmit, to a user equipment (UE), a Layer 1/Layer 2 (L1/L2) mobility configuration for each cell in a configured cell set, wherein the L1/L2 mobility configuration identifies a primary cell configuration for each secondary cell in the configured cell set, a secondary cell configuration for each primary cell in the configured cell set, and a measurement configuration for each cell in the configured cell set. The processor is further configured to receive a measurement report including measurement information based on signals measured by the UE from each activated cell of the configured cell set according to the measurement configuration. Additionally, the processor further configured to generate, based on the measurement report, an activation update configuration indicating at least one of a first cell of the configured cell set as being changed from a respective primary cell to a respective secondary cell, or a second cell of the configured cell set as being changed from a respective secondary cell to a respective primary cell. Additionally, the processor further configured to transmit, via an L1/L2 message, the activation update configuration.

Another example aspect includes an apparatus for wireless communication by a network entity, comprising means for transmitting, to a user equipment (UE), a Layer 1/Layer 2 (L1/L2) mobility configuration for each cell in a configured cell set, wherein the L1/L2 mobility configuration identifies a primary cell configuration for each secondary cell in the configured cell set, a secondary cell configuration for each primary cell in the configured cell set, and a measurement configuration for each cell in the configured cell set. The apparatus further includes means for receiving a measurement report including measurement information based on signals measured by the UE from each activated cell of the configured cell set according to the measurement configuration. Additionally, the apparatus further includes means for generating, based on the measurement report, an activation update configuration indicating at least one of a first cell of the configured cell set as being changed from a respective primary cell to a respective secondary cell, or a second cell of the configured cell set as being changed from a respective secondary cell to a respective primary cell. Additionally, the apparatus further includes means for transmitting, via an L1/L2 message, the activation update configuration.

Another example aspect includes a computer-readable medium comprising stored instructions for wireless communication by a network entity, wherein the instructions are executable by a processor to transmit, to a user equipment (UE), a Layer 1/Layer 2 (L1/L2) mobility configuration for each cell in a configured cell set, wherein the L1/L2 mobility configuration identifies a primary cell configuration for each secondary cell in the configured cell set, a secondary cell configuration for each primary cell in the configured cell set, and a measurement configuration for each cell in the configured cell set. The instructions are further executable to receive a measurement report including measurement information based on signals measured by the UE from each activated cell of the configured cell set according to the measurement configuration. Additionally, the instructions are further executable to generate, based on the measurement report, an activation update configuration indicating at least one of a first cell of the configured cell set as being changed from a respective primary cell to a respective secondary cell, or a second cell of the configured cell set as being changed from a respective secondary cell to a respective primary cell. Additionally, the instructions are further executable to transmit, via an L1/L2 message, the activation update configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 5B is an example of a serving cell configuration in accordance with various aspects of the present disclosure.

FIG. 5C is an example of a an L1/L2 mobility configuration in accordance with various aspects of the present disclosure.

FIG. 5D is an example of an L1/L2 mobility configuration in accordance with various aspects of the present disclosure.

FIG. 5F is an example of a cell group configuration in accordance with various aspects of the present disclosure.

FIG. 5G is an example of an index field in accordance with various aspects of the present disclosure.

FIG. 5H is an example of a cell group configuration in accordance with various aspects of the present disclosure.

FIG. 8 is a flowchart of a method of wireless communication.

FIG. 9 is a flowchart of a method of wireless communication.

FIG. 10 is a flowchart of a method of wireless communication.

FIG. 13 is a flowchart of a method of wireless communication.

FIG. 14 is a flowchart of a method of wireless communication.

DETAILED DESCRIPTION

Figure 1A:
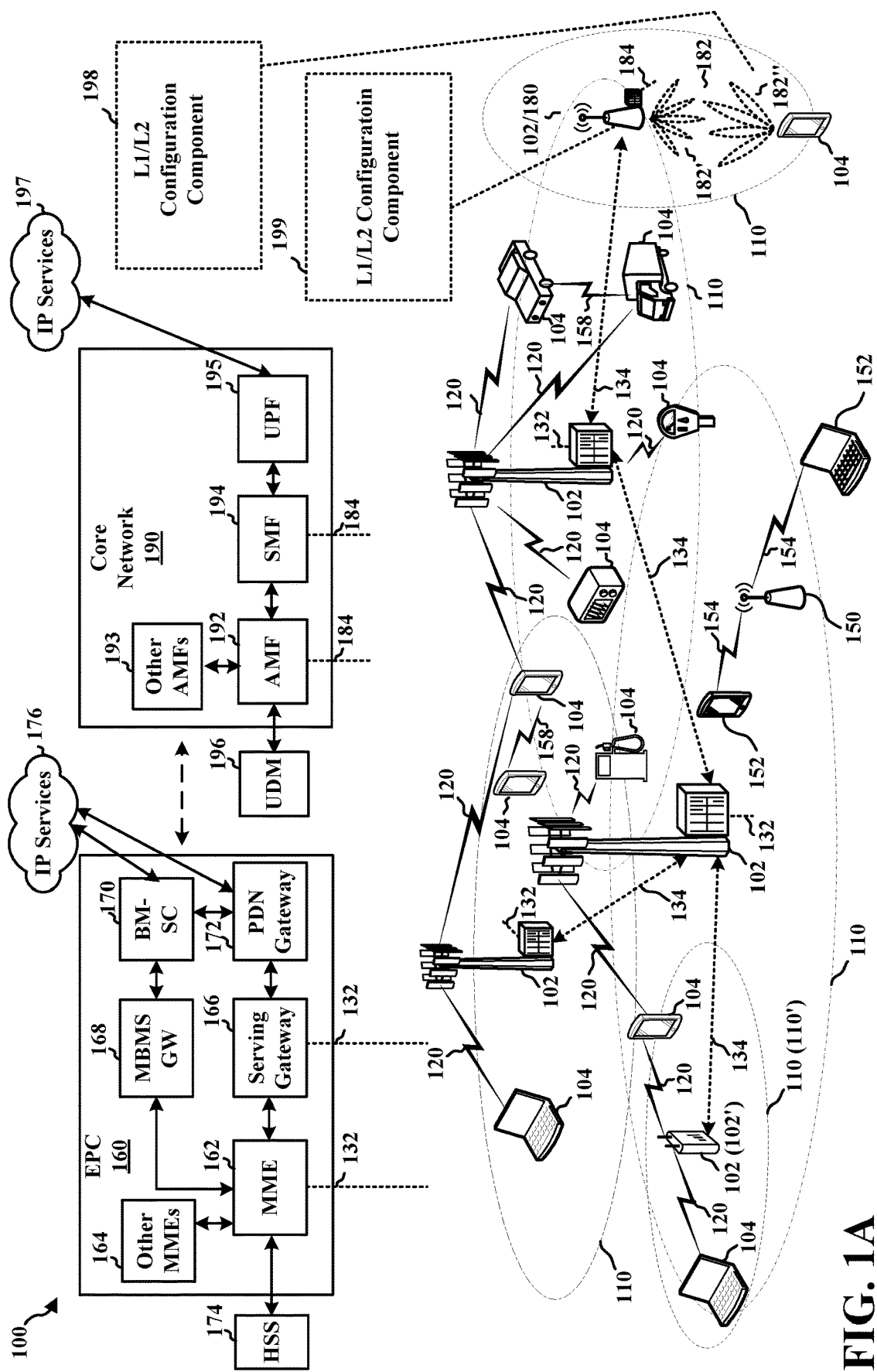
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Existing techniques for updating a primary cell of a user equipment during inter-cell mobility of a user equipment (UE) require a radio resource configuration (RRC) reconfiguration to be performed by a network entity. However, RRC reconfiguration is a layer-3 signaling and the latency of layer-3 signaling can prevent the UE from successfully updating to the new primary cell if the UE is moving fast and/or if the latency requirements of the UE require constant control connection and data connection with the primary cell while the UE is moving.

Accordingly, the techniques described herein reduce the latency for the UE to update to new primary cell by using layer-1/layer-2 (L1/L2) signaling from the network entity for mobility latency reduction. In an aspect, the L1/L2 signaling is an L1/L2 mobility configuration that includes at least a primary cell configuration for each secondary cell, and at least a secondary cell configuration for each primary cell, which allows the UE to quickly switch from one primary cell to another since the UE already has the configurations. In another aspect, the L1/L2 signaling is an L1/L2 mobility configuration that includes both primary cell and secondary cell configurations for all primary and secondary cells, which again allows the UE to quickly switch from one primary cell to another since the UE already has the configurations. Additional aspects are described below.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system 100 (also referred to as a wireless wide area network (WWAN)) that includes base stations 102 (also referred to herein as network entities), user equipment (s) (UE) 104, an Evolved Packet Core (EPC) 160, and another core network 190 (e.g., a 5G Core (5GC)).

One or more of the UE 104 may include a layer-1/layer-2 (L1/L2) configuration component 198, and one or more of the base stations 102/180 may be configured to include an L1/L2 configuration component 199, wherein the L1/L2 configuration component 198 and L1/L2 configuration component 199 are operable to perform L1/L2 techniques for UE mobility latency reduction, such as for inter-cell mobility.

Figure 6:
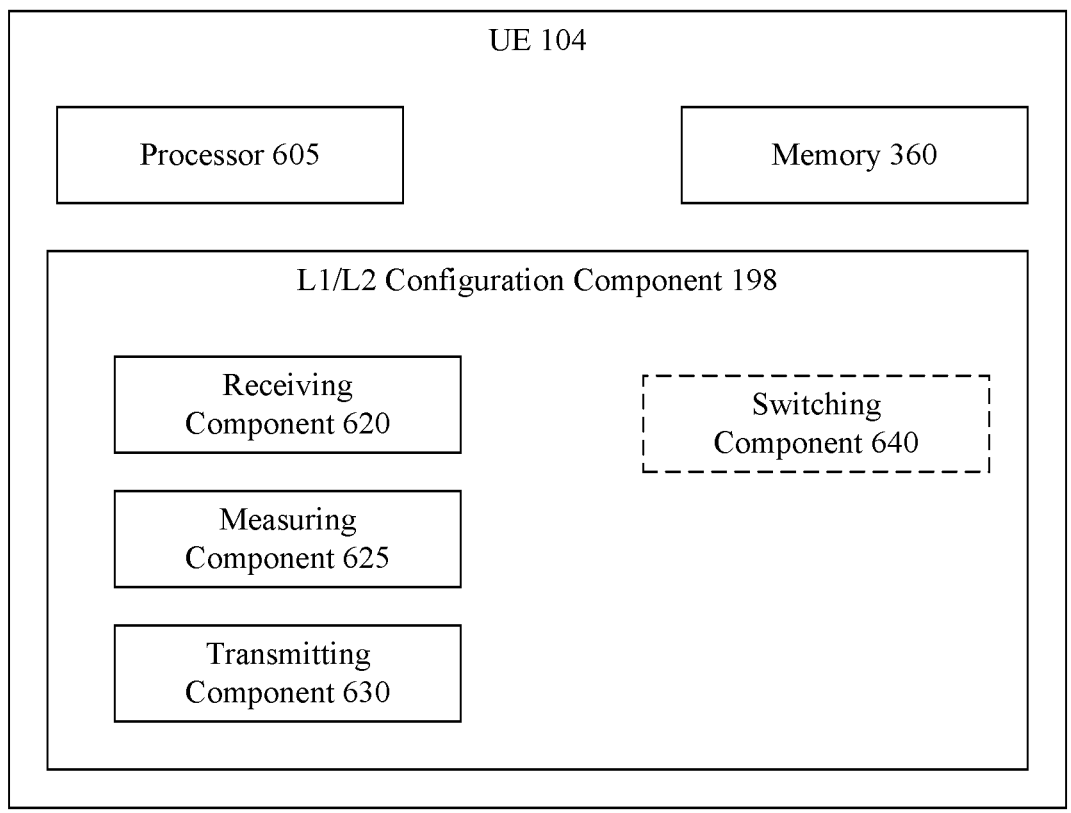
FIG. 6 is a diagram illustrating an example of a hardware implementation for an example apparatus.

At one or more of the UEs 104, and additionally referring to FIG. 6, the L1/L2 configuration component 198 includes a receiving component 620 configured to receive a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set. Further, the L1/L2 configuration component 198 includes a measuring component 625 configured to measure signals from each cell of the configured cell set according to the measurement configuration. Additionally, the L1/L2 configuration component 198 includes a transmitting component 630 configured to transmit a measurement report including measurement information based on the signals measured from each activated cell of the configured cell set. Also, in some optional or additional aspects, the L1/L2 configuration component 198 may include a switching component 640 configured to switch use of configuration information for communicating with the at least one of the first cell or the second cell based on the activation update configuration, including switching from use of a respective primary cell configuration for the first cell to a respective secondary cell configuration for the first cell, or switching from use of a respective secondary cell configuration for the second cell to a respective primary cell configuration for the second cell.

Figure 12:
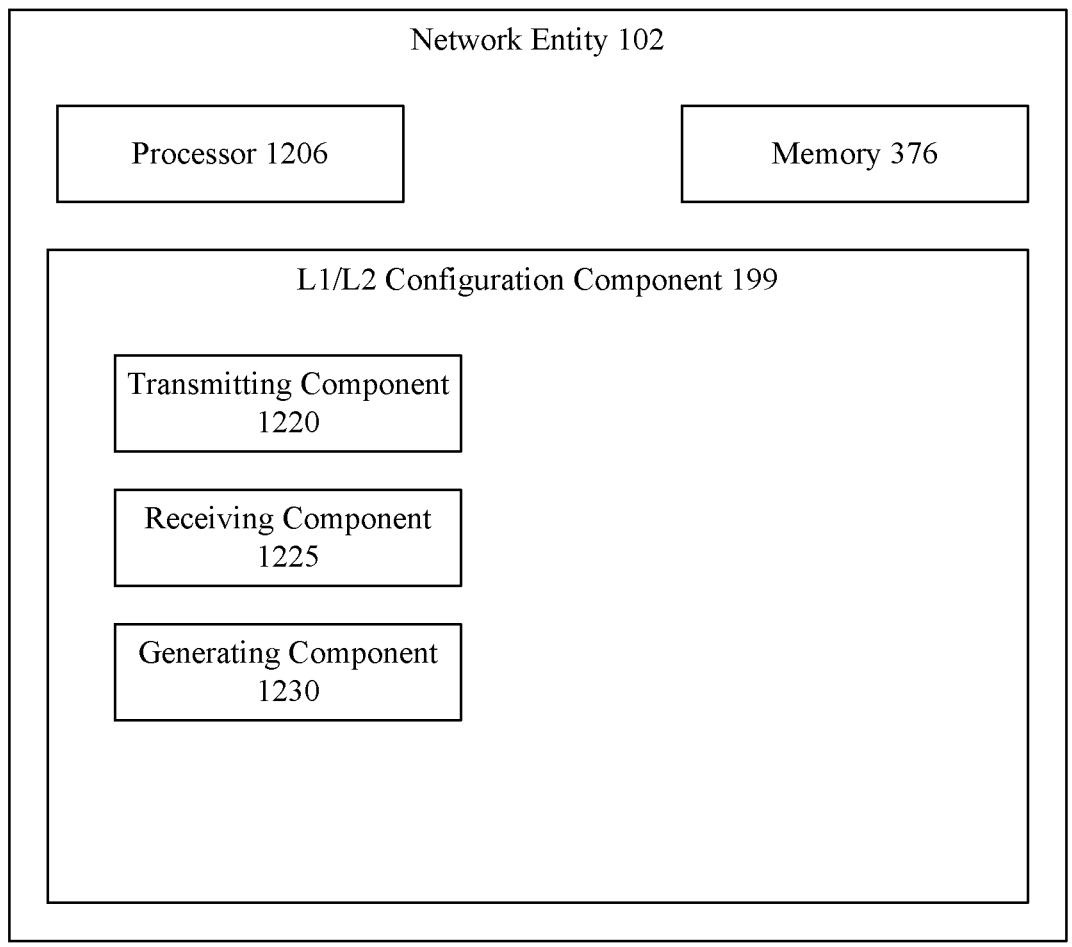
FIG. 12 is a diagram illustrating another example of a hardware implementation for another example apparatus.

At one or more of the base stations 102/180 (or, network entities), and additionally referring to FIG. 12, the L1/L2 configuration component 199 includes a transmitting component 1220 configured to transmit, to a user equipment (UE), a Layer 1/Layer 2 (L1/L2) mobility configuration for each cell in a configured cell set, wherein the L1/L2 mobility configuration identifies a primary cell configuration for each secondary cell in the configured cell set, a secondary cell configuration for each primary cell in the configured cell set, and a measurement configuration for each cell in the configured cell set. The transmitting component 1220 may be configured to transmit, via an L1/L2 message, the activation update configuration. Additionally, the L1/L2 configuration component 199 includes a receiving component 1225 configured to receive a measurement report including measurement information based on signals measured by the UE from each activated cell of the configured cell set according to the measurement configuration. Further, the L1/L2 configuration component 199 includes a generating component 1230 configured to generate, based on the measurement report, an activation update configuration indicating at least one of a first cell of the configured cell set as being changed from a respective primary cell to a respective secondary cell, or a second cell of the configured cell set as being changed from a respective secondary cell to a respective primary cell.

The base stations (or network entities) 102 may include macrocells (high power cellular base station) and/or small cells (low power cellular base station). The macrocells include base stations. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs. Any of the disaggregated components in the D-RAN and/or O-RAN architectures may be referred to herein as a network entity.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a network entity, gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 1B:
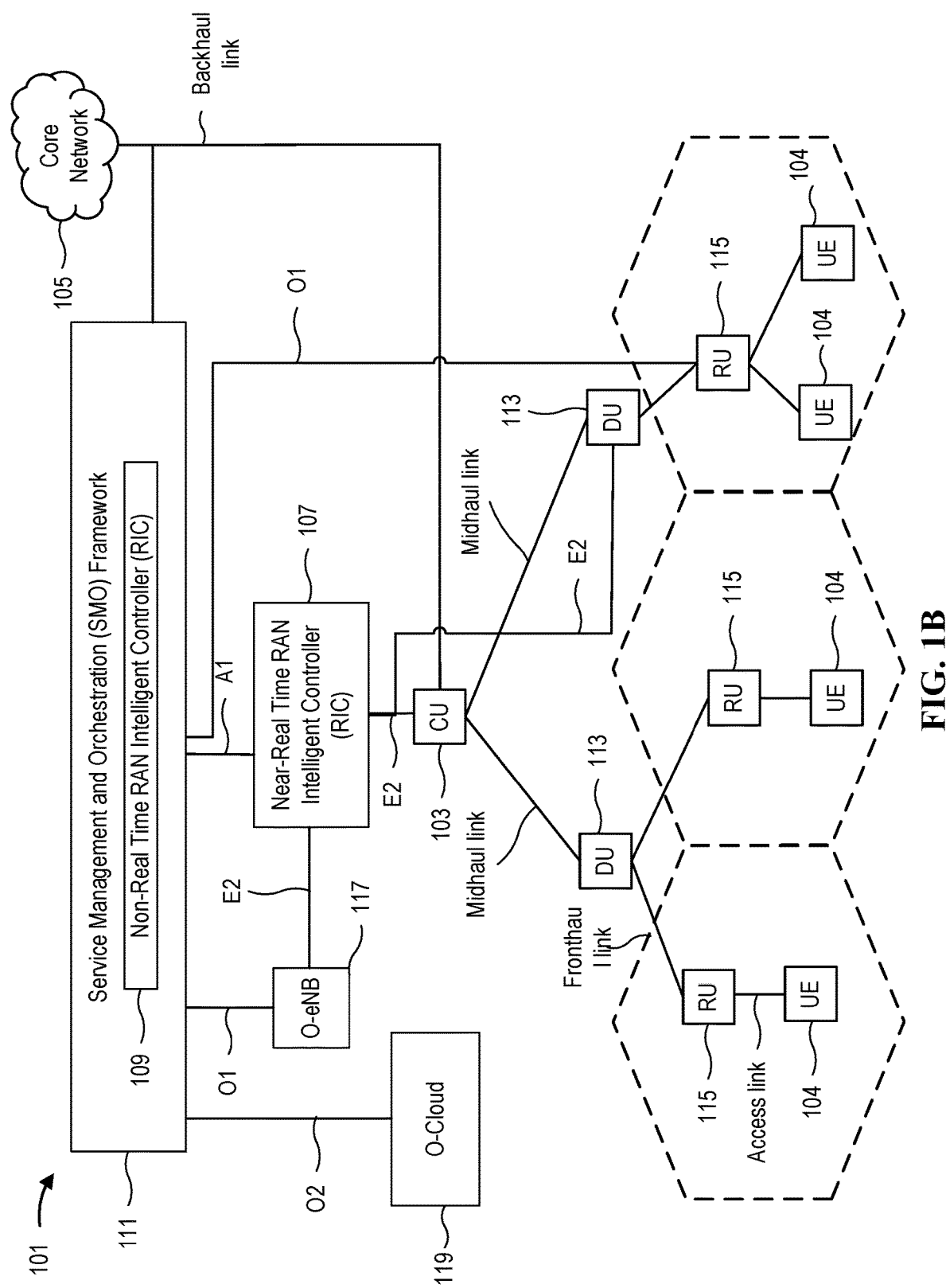
FIG. 1B is a diagram illustrating an example of disaggregated base station architecture, in accordance with various aspects of the present disclosure.

FIG. 1B is a diagram illustrating an example of disaggregated base station 101 architecture, any component or element of which may be referred to herein as a network entity. The disaggregated base station 101 architecture may include one or more central units (CUs) 103 that can communicate directly with a core network 105 via a backhaul link, or indirectly with the core network 105 through one or more disaggregated base station units (such as a Near-Real Time (Near-RT) RAN Intelligent Controller (RIC) 107 via an E2 link, or a Non-Real Time (Non-RT) RIC 109 associated with a Service Management and Orchestration (SMO) Framework 111, or both). A CU 103 may communicate with one or more distributed units (DUs) 113 via respective midhaul links, such as an F1 interface. The DUs 113 may communicate with one or more radio units (RUs) 115 via respective fronthaul links. The RUs 115 may communicate with respective UEs 104 via one or more radio frequency (RF) access links. In some implementations, the UE 104 may be simultaneously served by multiple RUs 115.

Each of the units, e.g., the CUs 103, the DUs 113, the RUs 115, as well as the Near-RT RICs 107, the Non-RT RICs 109 and the SMO Framework 111, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 103 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 103. The CU 103 may be configured to handle user plane functionality (i.e., Central Unit-User Plane (CU-UP)), control plane functionality (i.e., Central Unit-Control Plane (CU-CP)), or a combination thereof. In some implementations, the CU 103 can be logically split into one or more CU-UP units and one or more CU-CP units. The CU-UP unit can communicate bidirectionally with the CU-CP unit via an interface, such as the E1 interface when implemented in an O-RAN configuration. The CU 103 can be implemented to communicate with the DU 113, as necessary, for network control and signaling.

The DU 113 may correspond to a logical unit that includes one or more base station functions to control the operation of one or more RUs 115. In some aspects, the DU 113 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 113 may further host one or more low PHY layers. Each layer (or module) can be implemented with an interface configured to communicate signals with other layers (and modules) hosted by the DU 113, or with the control functions hosted by the CU 103.

Lower-layer functionality can be implemented by one or more RUs 115. In some deployments, an RU 115, controlled by a DU 113, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 115 can be implemented to handle over the air (OTA) communication with one or more UEs 104. In some implementations, real-time and non-real-time aspects of control and user plane communication with the RU(s) 115 can be controlled by the corresponding DU 113. In some scenarios, this configuration can enable the DU(s) 113 and the CU 103 to be implemented in a cloud-based RAN architecture, such as a vRAN architecture.

The SMO Framework 111 may be configured to support RAN deployment and provisioning of non-virtualized and virtualized network elements. For non-virtualized network elements, the SMO Framework 111 may be configured to support the deployment of dedicated physical resources for RAN coverage requirements which may be managed via an operations and maintenance interface (such as an O1 interface). For virtualized network elements, the SMO Framework 111 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 103, DUs 113, RUs 115 and Near-RT RICs 107. In some implementations, the SMO Framework 111 can communicate with a hardware aspect of a 4G RAN, such as an open eNB (O-eNB) 117, via an O1 interface. Additionally, in some implementations, the SMO Framework 111 can communicate directly with one or more RUs 115 via an O1 interface. The SMO Framework 111 also may include a Non-RT RIC 109 configured to support functionality of the SMO Framework 111.

The Non-RT RIC 109 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 107. The Non-RT RIC 109 may be coupled to or communicate with (such as via an A1 interface) the Near-RT RIC 107. The Near-RT RIC 107 may be configured to include a logical function that enables near-real-time control and optimization of RAN elements and resources via data collection and actions over an interface (such as via an E2 interface) connecting one or more CUs 103, one or more DUs 113, or both, as well as an O-eNB, with the Near-RT RIC 107.

In some implementations, to generate AI/ML models to be deployed in the Near-RT RIC 107, the Non-RT RIC 109 may receive parameters or external enrichment information from external servers. Such information may be utilized by the Near-RT RIC 107 and may be received at the SMO Framework 111 or the Non-RT RIC 109 from non-network data sources or from network functions. In some examples, the Non-RT RIC 109 or the Near-RT RIC 107 may be configured to tune RAN behavior or performance. For example, the Non-RT RIC 109 may monitor long-term trends and patterns for performance and employ AI/ML models to perform corrective actions through the SMO Framework 111 (such as reconfiguration via O1) or via creation of RAN management policies (such as A1 policies).

FIGS. 2A-2D are diagrams of various frame structures, resources, and channels used by UEs 104 and base stations 102/180 for communication. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The sub-carrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
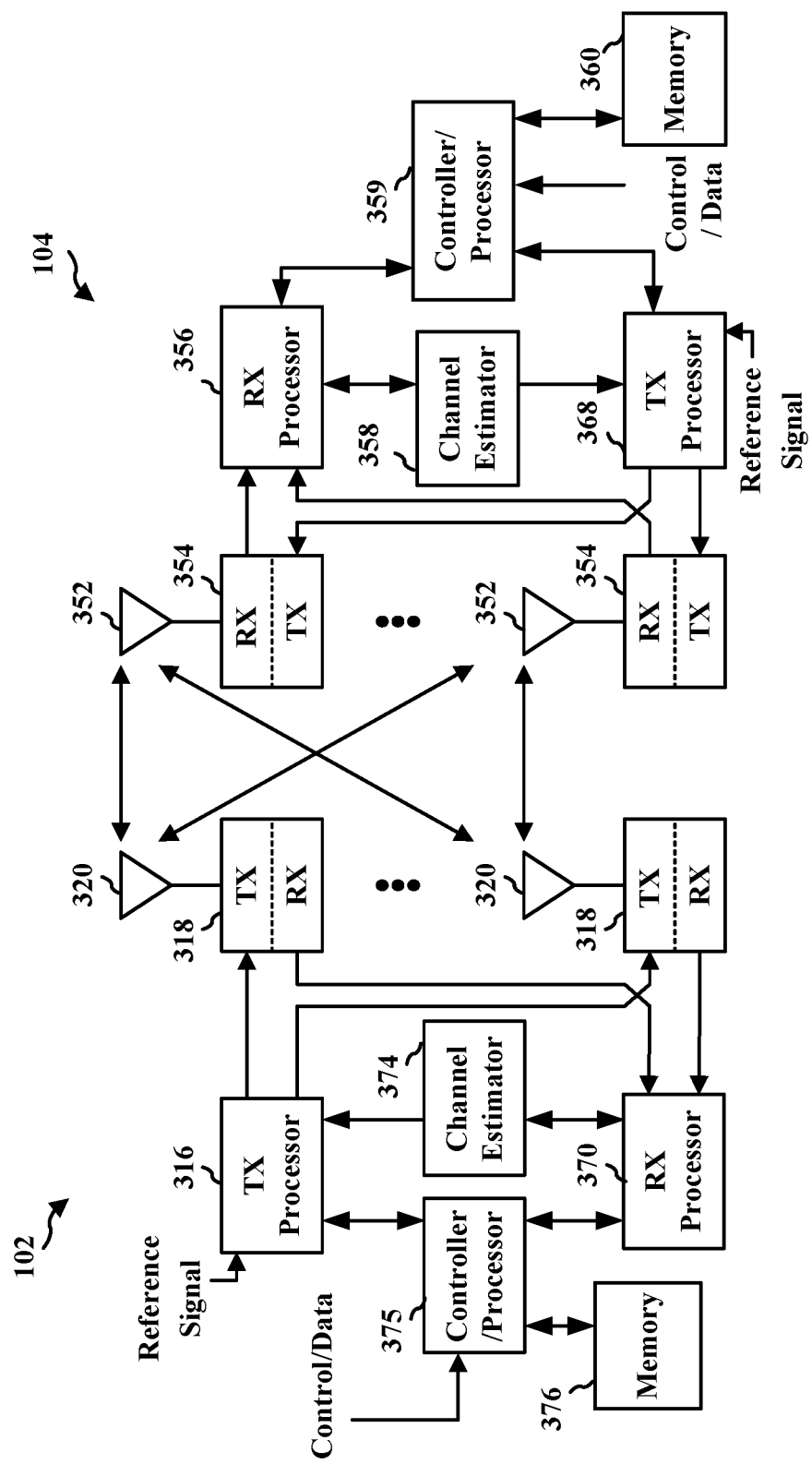
FIG. 3 is a diagram illustrating an example of a base station and user equipment (UE) in an access network.

FIG. 3 is a block diagram of hardware components of the base station 102 (or 180) in communication with the UE 104 in the wireless communication network 100. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1A. For example, the memory 360 may include executable instructions defining the L1/L2 configuration component 198. The TX processor 368, the RX processor 356, and/or the controller/processor 359 may be configured to execute the L1/L2 configuration component 198.

At least one of the TX processor 316, the RX processor 370, and the controller/processor 375 may be configured to perform aspects in connection with 199 of FIG. 1A. For example, the memory 376 may include executable instructions defining the L1/L2 configuration component 199. The TX processor 316, the RX processor 370, and/or the controller/processor 375 may be configured to execute the L1/L2 configuration component 199.

Figure 4:
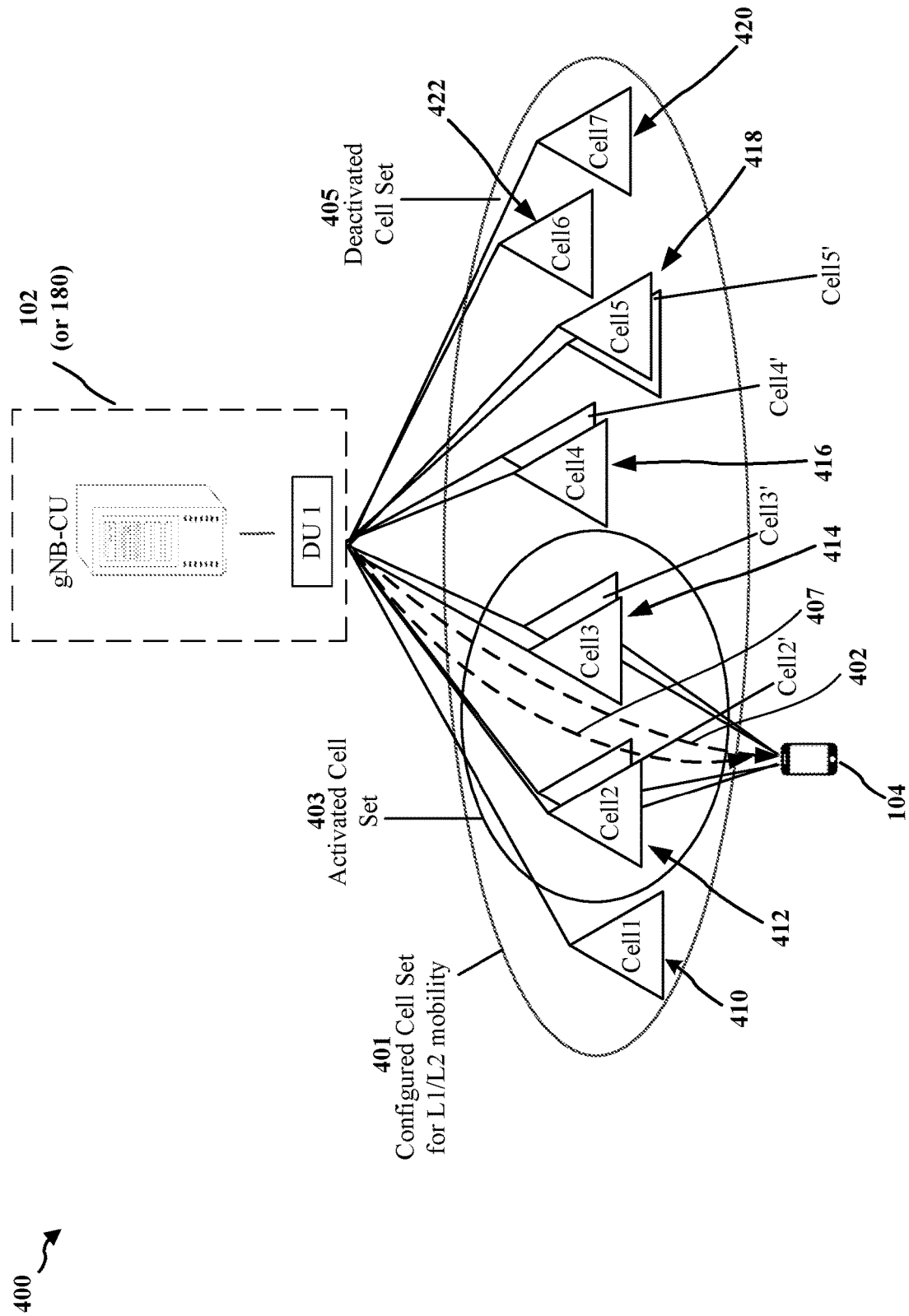
FIG. 4 is a diagram illustrating an example of an L1/L2 mobility configured cell set.

Referring to FIG. 4, currently, a network entity such as a base station 102/180, or a component of an D-RAN or O-RAN architecture, may configure UE 104 with a Layer-1/Layer-2 (L1/L2) mobility configured cell set 401 through an RRC configuration 402. For example, the network entity 102 may configure an L1/L2 mobility configured cell set 401 including the cells 410, 412, 414, 416, 418, 420, and 422, for the UE 104. Each of the cells 410, 412, 414, 416, 418, 420, and 422 may operate on different frequencies. In some implementations, one or more cells of the L1/L2 mobility configured cell set 401 may be multiple-TRP (multi-TRP) cells. For example, as shown in FIG. 4, cells 412, 414, 416, 418 are multi-TRP cells. Each TRP of a multi-TRP cell may operate at different frequencies. For example, for the multi-TRP cell 412, Cell2 is one TRP of multi-TRP cell 412 operating at a first frequency and Cell2' is another TRP multi-TRP 412 operating at a second frequency. Similarly, for multi-TRP cell 414, Cell3 is one TRP operating at a third frequency and Cell3' is another TRP operating at a fourth frequency. In some implementations, the first and third frequencies may be same frequency, and the second and fourth frequencies may be same frequency. For multi-TRP cell 416, Cell4 and Cell4' are the different TRPs operating at different frequencies, and for multi-TRP cell 418, Cell5 and Cell5' are the different TRPs operating at different frequencies. In some implementations, Cell4 and/or Cell5 may operate on the same frequency as Cell2 and/or Cell3, and Cell4' and/or Cell5' may operate on the same frequency as Cell2' and/or Cell3'. Only one frequency may be activated at a time for multi-TRP cells, and the multi-TRP cell may operate using the TRP corresponding to that frequency.

Of the cells configured to be part of the L1/L2 mobility configured cell set 401, the network entity 102 may configure cells 412 and 414 as activated cells in an activated cell set 403, and the remaining cells as deactivated cells in a deactivated cell set 405.

The network entity 102 may configure one of the activated cells as primary cell (pCell) for the UE 104, and the other cells as secondary cells (sCells) The network entity 102 may transmit to the UE 104 configurations for the cells 410, 412, 414, 416, 418, 420, and 422 via an RRC message or RRC configuration 402. Each cell configuration may only include parameters for its current cell type. For example, if cell 410 is currently an sCell, then the configuration for cell 410 will include parameters for sCell, but no pCell configuration or parameters for pCell. Similarly, if cell 412 is currently configured as a pCell, then the configuration for the cell 412 will include parameters for pCell but sCell configurations or parameters of sCell configurations.

Therefore, if the pCell for the UE 104 needs to be updated to a new cell, then the network entity 102 will have to perform an RRC reconfiguration and may transmit new or updated configurations for the cells 410, 412, 414, 416, 418, 420, and/or 422 again, where the new or updated configuration for the new cell configured as pCell will include parameters for pCell configuration, but not an sCell configuration, and the configuration of the cell previously configured as pCell will now include parameters for an sCell configuration but not a pCell configuration.

However, RRC reconfiguration is a layer-3 (L3) layer configuration or signaling, and the latency of L3 configuration or signaling can prevent the UE 104 from successfully updating to the new pCell when the UE 104 is moving fast and/or when the latency requirements of the UE 104 require constant control connection and data connection with pCell while the UE 104 is moving.

Aspects described herein relate to techniques for reducing UE mobility latency, and specifically to reduce the latency to update the UE 104 to a new pCell, by using L1/L2 signaling 407, such as an activation update configuration, combined with configuring the UE 102 with alternate configurations for each cell. For example, the configuring of the UE 102 with alternate configurations includes, for example, the RRC configuration 402 additionally including at least a primary cell configuration for each secondary cell and at least a secondary cell configuration for each primary cell. Also, for example, the L1/L2 signaling 407 including the activation update configuration indicates at least one of a first cell of the configured cell set as being changed from a respective primary cell to a respective secondary cell, or a second cell of the configured cell set as being changed from a respective secondary cell to a respective primary cell. According to the described aspects: the L1/L2 mobility configured cell set 401 is an RRC-configured set of cells for L1/L2 mobility; the activated cell set 403 is an L1/L2 Mobility Activated cell set including a group of cells in the configured set that are activated and can be readily be used for data and control transfer; and the deactivated cell set 405 is an L1/L2 Mobility Deactivated cell set including a group of cells in the configured set that are deactivated and can be readily be activated by L1/L2 signaling. Consequently, L1/L2 signaling is used to activate/deactivate cells in the set and to select beams within the activated cells, for example, as the UE 104 moves, the cells from the set are deactivated and activated by L1/L2 signaling based on the signal quality (e.g., measurement reports) and/or cell loading.

In other words, in the present aspects, all cells in the L1/L2 configured cell set have valid primary cell and secondary cell configurations, and L1/L2 signaling is used to set or select the primary cell out of the preconfigured options within the activated cell set. For example, L1/L2 signaling is used to switch a secondary cell to a primary cell (and a primary cell to a secondary cell), which is faster and more efficient than current solutions, where a primary cell can only be changed using L3 signaling. Also, in these aspect, RRC signaling (L3) updates the set of cells for L1/L2 mobility. Thus, the present aspects relate to signaling of individual cell configuration to enable each secondary cell with a primary cell configurations, including example information elements for such configuration. Also, the present aspects relate to signaling of the change of cells in the configured L1/L2 mobility cell set, including example signaling to remove cells from the configured L1/L2 mobility cell set.

Therefore, the present aspects specify mechanisms and procedures of L1/L2 based inter-cell mobility for mobility latency reduction, which may include configuration and maintenance for multiple candidate cells to allow fast application of configurations for candidate cells, and/or a dynamic switch mechanism among candidate serving cells (including special cell (SpCell) and secondary cell (SCell)) for potential applicable switching scenarios based on L1/L2 signaling.

Additional details of these techniques are described herein with respect to FIGS. 5A-15.

Figure 5A:
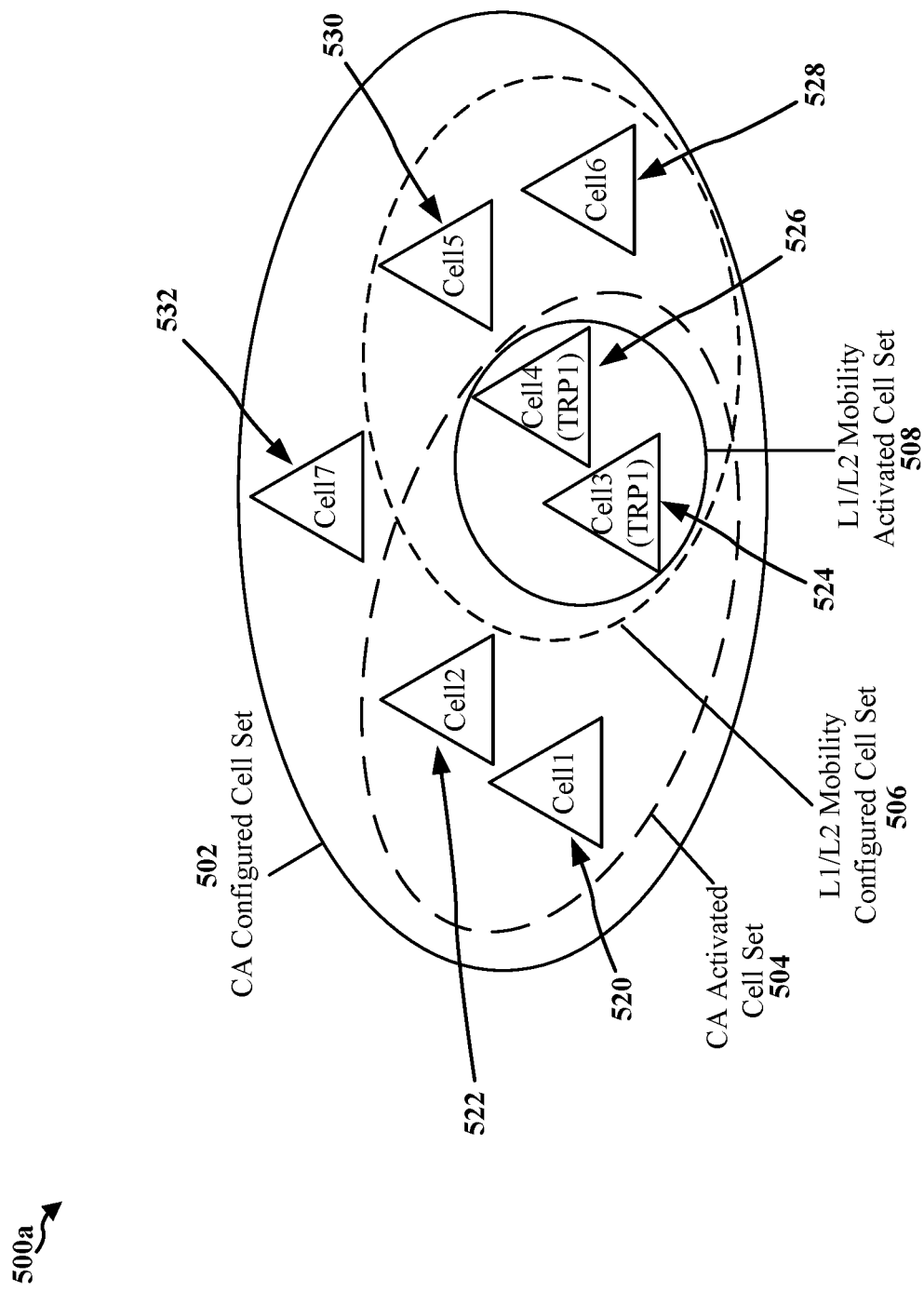
FIG. 5A is a diagram illustrating an example of a carrier aggregation configured cell set in accordance with various aspects of the present disclosure.

Turning now to FIG. 5A, diagram 500*a* includes an example of a carrier aggregation (CA) configured cell set, which will be discussed in the context of L1/L2 mobility, carrier aggregation configuration, and individual cell signaling. In FIG. 5A, a network entity (e.g., BS 102) (not shown separately in FIG. 5A) may configure the CA configured cell set 502. The CA configured cell set 502 may include cells 520, 522, 524, 526, 528, 530, and 532. Each of the cells 520, 522, 524, 526, 528, 530, and 532 may operate on different frequencies. In some implementations, one or more of the cells in the CA configured cell set 502 may be multi-TRP cells. For example, in FIG. 5A, cells 524 and 526 may be multi-TRP cells, where Cell3 may be one TRP of multi-TRP cell 524 operating at a frequency different from another TRP of multi-TRP cell 524 operating at a different frequency, and Cell4 may be one TRP of multi-TRP cell 526 operating at a frequency different from another TRP of multi-TRP cell 526 operating at a different frequency. Only one frequency may be activated at a time for multi-TRP cells, and the multi-TRP cell may operate using the TRP corresponding to that frequency.

Within the CA configured cell set 502, the network entity (e.g., BS 102) may configure a first set of cells as part of a CA activated cell set 504. For example, as shown in FIG. 5A, the network entity (e.g., BS 102) may configure cells 520, 522, 524, and 526 as part of the CA activated cell set 504. The network entity (e.g., BS 102) may configure a second set of cells as part of the L1/L2 mobility configured cell set 506. For example, as shown in FIG. 5A, the network entity (e.g., BS 102) may configure cells 524, 526, 528, and 530 as part of the L1/L2 mobility configured cell set 506. The network entity (e.g., BS 102) may configure one or more cells as activated cells and part of the L1/L2 mobility activated cell set 508. For example, as shown in FIG. 5A, the network entity (e.g., BS 102) may configure cells 524 and 526 as activated cells and may include the cells 524 and 526 as part of the L1/L2 mobility activated cell set 508.

The network entity (e.g., BS 102) may transmit one or more configurations for the CA configured cell set 502 to a UE 104. The configuration(s) for the CA configured cell set 502 may indicate all the cells configured to be part CA configured cell set 502. For example, the configuration(s) may indicate to the UE that the cells 520, 522, 524, 526, 528, 530, and 532 are part of the CA configured cell set. In some implementations, the configuration for the CA configured cell set 502 may indicate a special cell (SpCell) or a primary cell (pCell) for the UE from the cells configured in the CA configured cell set 502, and/or one or more secondary cells (sCells) for the UE in the CA from the cells configured in the CA configured cell set 502. For example, if cell 524 is a configured to be an SpCell or a pCell for the UE, then the configuration(s) for the CA configured cell set 502 may indicate that the cell 524 is an SpCell or a pCell. Similarly, the configuration(s) for the CA configured cell set 502 may indicate that cells 520, 522, 526, 528, 530, and 532 are sCells for the UE. The network entity (e.g., BS 102) may transmit the configuration(s) for the CA configured cell set 502 via a layer-3 (L3) message (e.g., RRC message(s), RRC configuration(s), and the like).

In some implementations, the network entity (e.g., BS 102) may indicate to the UE 104 the cells that are configured to be part of the CA activated cell set 504. In some implementations, the network entity (e.g., BS 102) may indicate the cells in the CA activated cell set 504 in the CA configured cell set 502 configuration. In some implementations, the network entity (e.g., BS 102) may indicate the cells in the CA activated cell set 504 via one or more L3 messages.

According to the present aspects, the network entity (e.g., BS 102) may indicate to the UE 104 the cells that are configured to be part of the L1/L2 mobility configured cell set 506 and/or the cells that are configured to be part of the L1/L2 mobility activated cell set 508. In some implementations, the network entity (e.g., BS 102) may indicate the cells in the L1/L2 mobility configured cell set 506 and/or the L1/L2 mobility activated cell set 508 via one or more configurations transmitted to the UE via a layer-3 message (e.g., via RRC messages, RRC configuration, and the like). In some implementations, the network entity (e.g., BS 102) may indicate the L1/L2 mobility configured cell set 506 and/or the L1/L2 mobility activated cell set 508 in the configuration(s) of the CA configured cell set 502. In this case, the network entity (e.g., BS 102) utilizes the carrier aggregation configuration with additional information elements to facilitate L1/L2 mobility within the CA configured cell set 502. The L1/L2 mobility configured cell set 506 may be a subset of, or may encompass the whole of, the CA configured cell set 502.

For each cell in the L1/L2 mobility configured cell set 506, the network entity (e.g., BS 102) may determine one or more special cell (SpCell) or primary cell (pCell) configurations and/or one or more secondary cell (sCell) configurations. The network entity (e.g., BS 102) may indicate, individually to each cell, the one or more SpCell or primary cell configurations, or the one or more sCell configurations in an L1/L2 mobility configuration (L1L2MobilityConfig). In some implementations, the network entity (e.g., BS 102) may include the L1/L2 mobility configuration in the CA configured cell set 502 configuration(s) for the cell. In some implementations, the network entity (e.g., BS 102) may indicate or transmit the L1/L2 mobility configuration in a separate configuration via an L3 message (e.g., via an RRC message, RRC configuration, and the like).

In some implementations, for each cell in the L1/L2 mobility configured cell set 506, the L1/L2 mobility configuration may include one or more complimentary or alternative configurations to its existing cell type (e.g., SpCell/pCell for an sCell, or sCell for an pCell/SpCell) configuration. For example, if cell 524 is configured as the pCell for a UE, then the network entity (e.g., BS 102), in the L1/L2 mobility configuration, may indicate one or more sCell configurations for cell 524 to allow a quick switch of configurations, such as if a currently configured secondary cell, e.g., cell 526 is switched to be a primary cell. Similarly, if cell 526 is configured as an sCell for the UE, then the network entity (e.g., BS 102), in the L1/L2 mobility configuration, may indicate one or more SpCell or pCell configurations for cell 526 to allow a quick switch of configurations, e.g., if cell 526 is switched to be a primary cell. As described herein, the L1/L2 signaling to switch the configuration of a cell being used by the UE 104 may be referred to an activation update configuration. It should be noted that the L1/L2 mobility configuration may provide a plurality of different primary cell configurations and/or secondary cell configurations for each cell, where the actual configuration to be activated is specified in the L1/L2 signaling. Moreover, the L1/L2 mobility configuration may include an L1 measurement configuration for each cell in a deactivated cell state.

Referring to FIG. 5B, in one example, a carrier aggregation configuration 500b includes the L1/L2 mobility configuration (L1L2MobilityConfig) 501 as one or more information elements. In this example, the carrier aggregation configuration 500b include a cell group configuration (CellGroupConfig) 503 and associated information elements, a secondary cell configuration (SCellConfig) 505 and associated information elements, and a primary or serving cell configuration (ServingCellConfig) 507 and associated information elements.

Moreover, in this example, the network entity (e.g., BS 102) may indicate or include the one or more L1/L2 mobility configurations 501 in the serving cell configuration 507 for each cell in the L1/L2 mobility configured cell set 506. For example, for each of the cells 524, 528, 530, 532, the network entity (e.g., BS 102) may indicate or include the one or more L1/L2 mobility configurations 501 in the respective serving cell configurations 507.

By including the L1/L2 mobility configuration 501 in the carrier aggregation configuration 500b, the present aspects for L1/L2 mobility configuration at the same time that carrier aggregation is configured and upon carrier aggregation configuration. In an aspect, the L1L2MobilityConfig contains at least Pcell configuration for SCell and SCell configuration for PCell. In an aspect, the L1L2MobilityConfig also contains one or more L1 measurement configuration for measuring cells in a deactivated state, which is reported in a measurement report and is utilized for UE mobility (e.g., if the UE moves into a location where the deactivated cell should be activated). In an aspect, the L1L2MobilityConfig contains information elements like spCellConfig and SCellConfig. Also, in some cases, more than one PCell/SCell config may be provided for a cell (e.g. a list of each type of configuration may be provided), and the actual config to be activated is specified by L1/L2 signaling. For instance, the L1/L2 signaling may indicate an Scell configuration to apply if a cell is updated from Pcell to Scell by an L1/L2 mobility procedure. In another example, the L1/L2 signaling may indicate a PCell configuration to apply if a cell is updated from Scell to PCell by the L1/L2 mobility procedure.

Referring to FIGS. 5C and 5D, in some aspects, the network entity (e.g., BS 102) may indicate differential information elements or parameters 500c to configure a secondary cell as a primary or serving cell (FIG. 5C), or a full or whole serving cell configuration 500d (FIG. 5D).

In FIG. 5C, the network entity (e.g., BS 102) may indicate differential or additive information elements or parameters 500c associated with an SpCell or a pCell to be added to an existing secondary cell configuration to form a primary cell configuration, or removed or ignored in a primary cell configuration to form a secondary cell configuration. Examples of differential or additive information elements or parameters associated with updating a secondary cell configuration to an SpCell or a pCell configuration may include, but are not limited to, reconfigurationWithSync, rlk-TimesAndConstans, rlmInSyncOutSyncThreshold, and the like. Similarly, the network entity (e.g., BS 102) may indicate differential information elements or parameters associated with an sCell that are not used by a PCell, such as, but not limited to, sCellDeactivationTimer (optional field for SCell without PUCCH and when L1L2MobilityConfig is not enabled, it is absent otherwise), pathlossReferenceLinking (optional for SCell and when L1L2MobilityConfig is not enabled, it is absent otherwise), servingcellMO (mandatory for SpCell or SCell+L1L2MobilityConfig enabled if the UE has measConfig, it is optional for SCells+L1L2MobilityConfig not enabled), and the like. In an example, when an sCell is being updated to a Pcell, there are some sCell-specific information element (IEs) (in ServingCellConfig) that are not applicable any more, and the network entity may indicate (implicitly or explicitly) to disable or remove them from the configuration in order to form the primary cell configuration.

In FIG. 5D, in some implementations, the network entity (e.g., BS 102) may indicate multiple serving cell and/or secondary cell configurations 500d, such as but not limited to both (a) one or more SpCell or pCell configurations and (b) one or more sCell configurations 500d in the L1/L2 mobility configuration 501 for each cell in the L1/L2 mobility configured cell set 506.

Additionally, the network entity (e.g., BS 102) may indicate or include configurations for one or more measurements to be performed by the UE for the cells in the L1/L2 mobility configured cell set 506. The one or more measurements may be L1 measurements, such as channel station information reference signal (CSI-RS), synchronization signal reference signal received power (SS-RSRP), and the like. For each cell in the L1/L2 configured cell set 506, the network entity (e.g., BS 102) may indicate or include one or more L1 measurement configurations in the respective L1/L2 mobility configurations. By indicating or including L1 measurements for each cell in the L1/L2 mobility configured cell set 506, the network entity (e.g., BS 102) may cause the UE to perform L1 measurements for deactivated cells as well as the activated cells in the L1/L2 mobility configured cell set 506.

The UE 104, based on received L1/L2 mobility configurations, may perform L1 measurements for each cell in the L1/L2 mobility configured cell set 506. For example, the UE may measure reference signals such as CSI-RS, synchronization signals (SS), DMRS, and the like. The UE may generate and/or transmit a measurement report for each activated cell in the L1/L2 mobility configured cell set 506 based on the measured signals.

Based on the received measurement report, the network entity (e.g., BS 102) may determine whether to update a current pCell. For example, if the measurement report indicates that one or more signals measured from a current sCell of a UE are greater than the signals measured from a current SpCell or pCell of a UE, then the network entity (e.g., BS 102) may update the pCell for the UE to be the current sCell and update the current SpCell or pCell to be an sCell. The network entity (e.g., BS 102) may generate an activation update configuration indicating the change of the current pCell to an sCell and/or a current sCell to a pCell. In some implementations, the activation update configuration may indicate an identifier (e.g., cell ID) of the new cell configured to be a pCell. The network entity (e.g., BS 102) may signal the activation update configuration via an L1/L2 signal or message. For example, the network entity (e.g., BS 102) may indicate the cell configured to be the new pCell in DCI or MAC-CE.

The UE 104 may switch the configuration applied for the cell changed from being an SpCell or a pCell to an sCell, and the for the cell changed from an sCell to an SpCell or pCell based on the received activation update configuration. For example, if cell 524 was the previous SpCell or pCell, and the received activation update configuration indicates that cell 526 is the new SpCell or pCell, then, for cell 524, the UE may apply an sCell configuration indicated in the L1/L2 mobility configuration of cell 524 and, for cell 526, the UE may apply an SpCell or pCell configuration indicated in the L1/L2 mobility configuration of cell 526. Therefore, the configurations indicated in the L1/L2 mobility configurations of cells, the UE is able to apply or use SpCell or pCell configurations of the new pCell and the sCell configurations of the previous pCell and/or the new sCell without any RRC reconfigurations or other L3 messages/reconfigurations. Thus, the UE can reduce the time taken to establish a connection with a new SpCell or pCell.

Referring to FIGS. 5E to 5I, in another aspect, the present disclosure includes signaling to remove cells from the L1/L2 configured cell set 506. Specifically, the network entity (e.g., BS 102) may be configured to remove one or more cells from the L1/L2 configured cell set 506 in the case where such cells are no longer suitable for L1/L2 mobility. The network entity (e.g., BS 102) may remove the one or more cells based on various factors, such as but not limited to, the UE moving too far away from a cell, e.g., the channel conditions or received signal strength of the cell is below a threshold or another cell with better channel conditions or received signal strength is discovered in a case where the list of L1/L2 configured cells is limited, the distance between the UE and a cell satisfying a threshold distance, the list of L1/L2 configured number of deactivated cells satisfies a threshold deactivated cell number, and the like. Also, cells not in use may be stored in the deactivated cell set that forms a part of the configured L1/L2 mobility cell set, however, the UE may still need to perform measurement on the deactivated cell set, resulting in unnecessary power consumption. Removing the cells from the L1/L2 configured cell set 506 can reduce power consumption of the UE because the UE does not have to measure signals from the cells removed from the L1/L2 configured cell set 506.

Figure 5E:
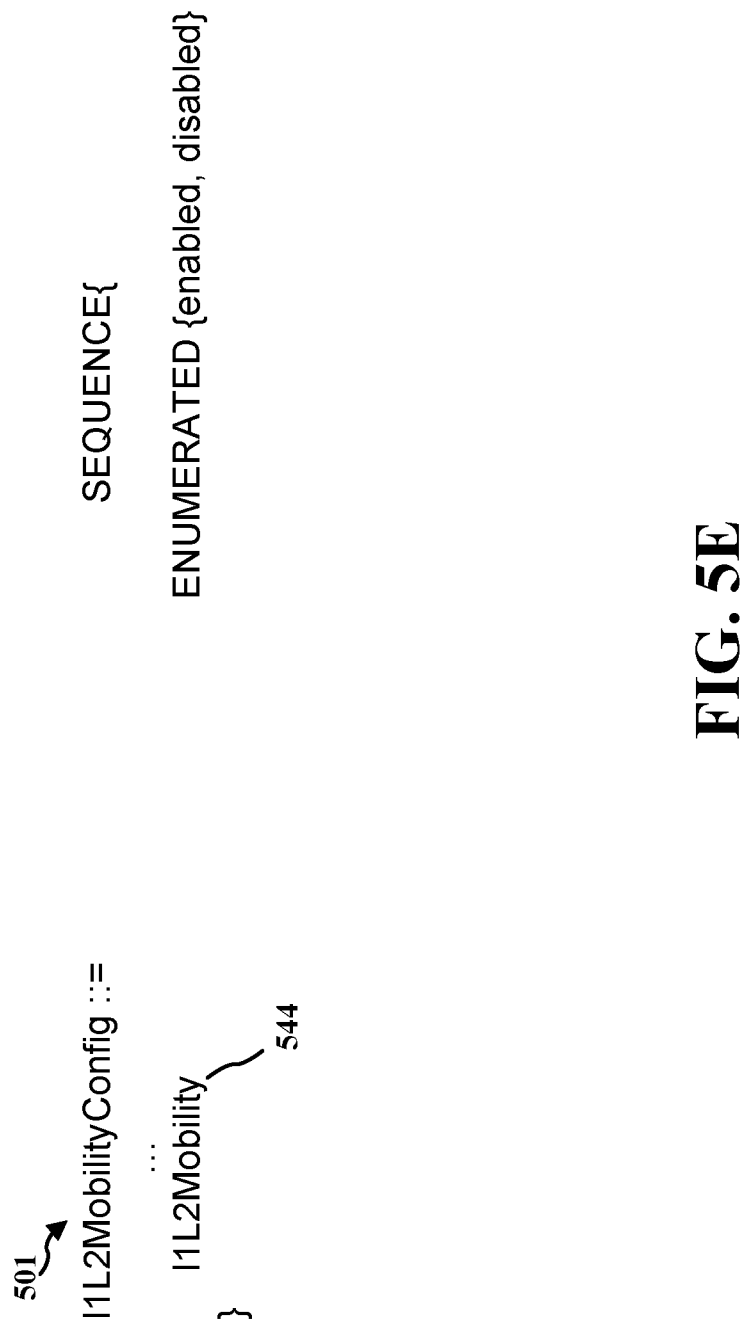
FIG. 5E is an example of an L1/L2 mobility configuration in accordance with various aspects of the present disclosure.

Referring to FIG. 5E, in some implementations, the network entity (e.g., BS 102) may include an information element or parameter in the L1/L2 mobility configuration 501 of a cell that indicates whether the cell has been removed from the L1/L2 mobility configured cell set 506. In other words, the enabled/disabled L1L2MobilityConfig may be indicated in the servingCellConfig of each cell. For example, in FIG. 5E, the L1/L2 mobility configuration 501 may include the L1L2mobility information element or parameter 544. If the L1L2mobility information element or parameter 544 is enabled, then the cell is configured to be part of the L1/L2 mobility cell set 506, and if the L1L2mobility information element or parameter 544 is not enabled or is disabled, then the cell is not configured or is removed from the L1/L2 mobility cell set 506.

The network entity may signal any of the removed cells via L1/L2 signaling (e.g., via DCI, MAC-CE, and the like). In some implementations, the UE may update the information element or parameter 544 to disabled in the L1/L2 mobility configurations 501 of the removed cells.

Figure 5G:
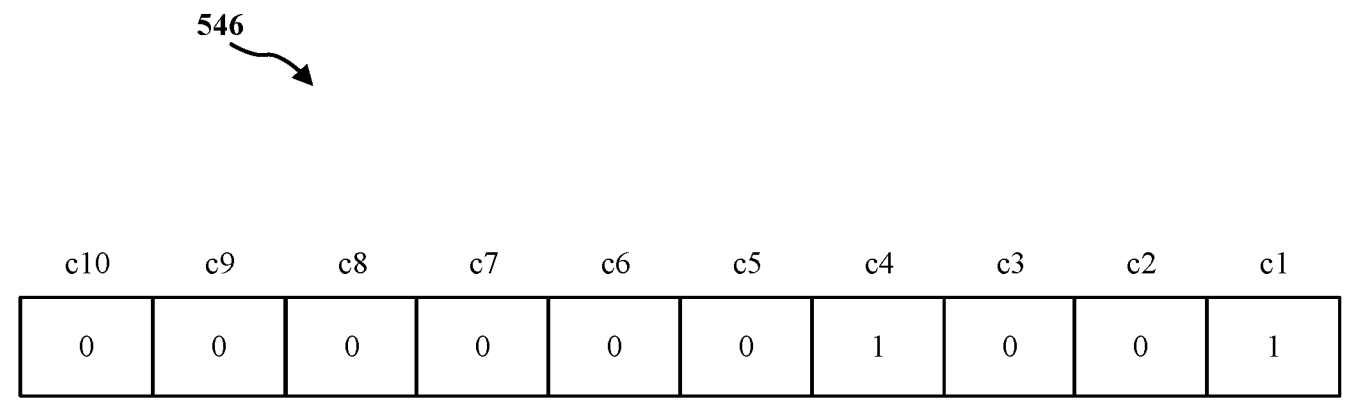

Referring to FIGS. 5F and 5G, in some implementations, the network entity (e.g., BS 102) may reuse an existing sCell index 546 to remove cells from the L1/L2 mobility configured cell set. In such implementations, the network entity (e.g., BS 102) may indicate or include an information element or parameter in a serving cell configuration or a cell group configuration of a cell. For example, in FIG. 5F, the cell group configuration 500*f* includes information element or parameter sCellL1L2MobilityToReleaseList 545, which indicates one or more sCells that are configured with the L1L2MobilityConfig to be removed from the L1/L2 mobility configured cell set 506, such as via the information element or parameter sCell index 546. In this example, the information element or parameter maxNrofSCellsL1L2Mobility is the maximum number of sCells that are configured with the L1L2MobilityConfig.

In some implementations, the network entity (e.g., BS 102) may indicate the removed cells in an sCell index field 546, where each position in the sCell index field corresponds to an sCell in a CA configured cell set (e.g., the CA configured cell set 502).

Figure 5I:
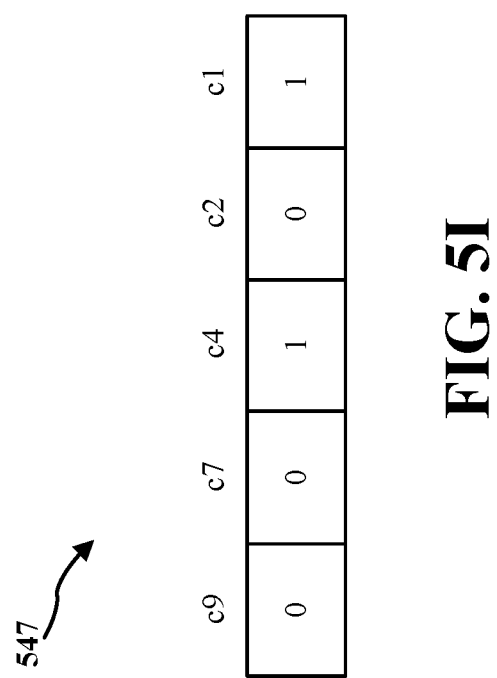
FIG. 5I is an example of an index field in accordance with various aspects of the present disclosure.

In FIG. 5G, an example of such an index field is sCell index 546 includes an example number of positions, 10, for an example number, 10, of sCells of a CA configured cell set. In this example, of the 10 sCells, sCell 1, 2, 4, 7, and 9 may be sCells that configured to be part of an L1/L2 mobility configured cell set. The network entity (e.g., BS 102) may determine to remove cells 1 and 4 from the L1/L2 mobility configured cell set, and may indicate the removal of these cells via L1/L2 signaling. For example, the network entity (e.g., BS 102) may indicate via L1/L2 signaling (e.g., via DCI, MAC-CE, and the like) the sCellL1L2MobilityToReleaseList 545 including the sCell index 546 having bit values in the index positions corresponding to the cells determined to be removed from the L1/L2 mobility configured cell set, e.g., where a value of "1" indicates to remove the cell. Based on receiving information element or parameter sCellL1L2MobilityToReleaseList 545, the UE 104 may remove the indicated sCells according to the values in the fields of the sCell index 546. Referring to FIGS. 5H and 5I, in some implementations, the network entity (e.g., BS 102) may generate a new index for sCells to be removed from the L1/L2 configured cell set, wherein an example of such a new index is the information element or parameter sCellL1L2MobilityIndex 547. For example if 5 sCells are configured to be part of the L1/L2 configured cell set, then the sCellL1L2MobilityIndex 547 may have positions or have a size of 5. The network entity (e.g., BS 102) may indicate via L1/L2 signaling (e.g., DCI, MAC-CE, and the like) the cells to be removed in an index field corresponding to the size of the sCellL1L2MobilityIndex as shown in FIG. 5I, which in this example indicates cells 1 and 4 as sCells to be removed, e.g., based on the values of "1" in the corresponding index fields. Based on receiving information element or parameter sCellL1L2MobilityToReleaseList 545, the UE 104 may remove the indicated sCells according to the values in the fields of the sCellL1L2MobilityIndex 547.

Figure 7:
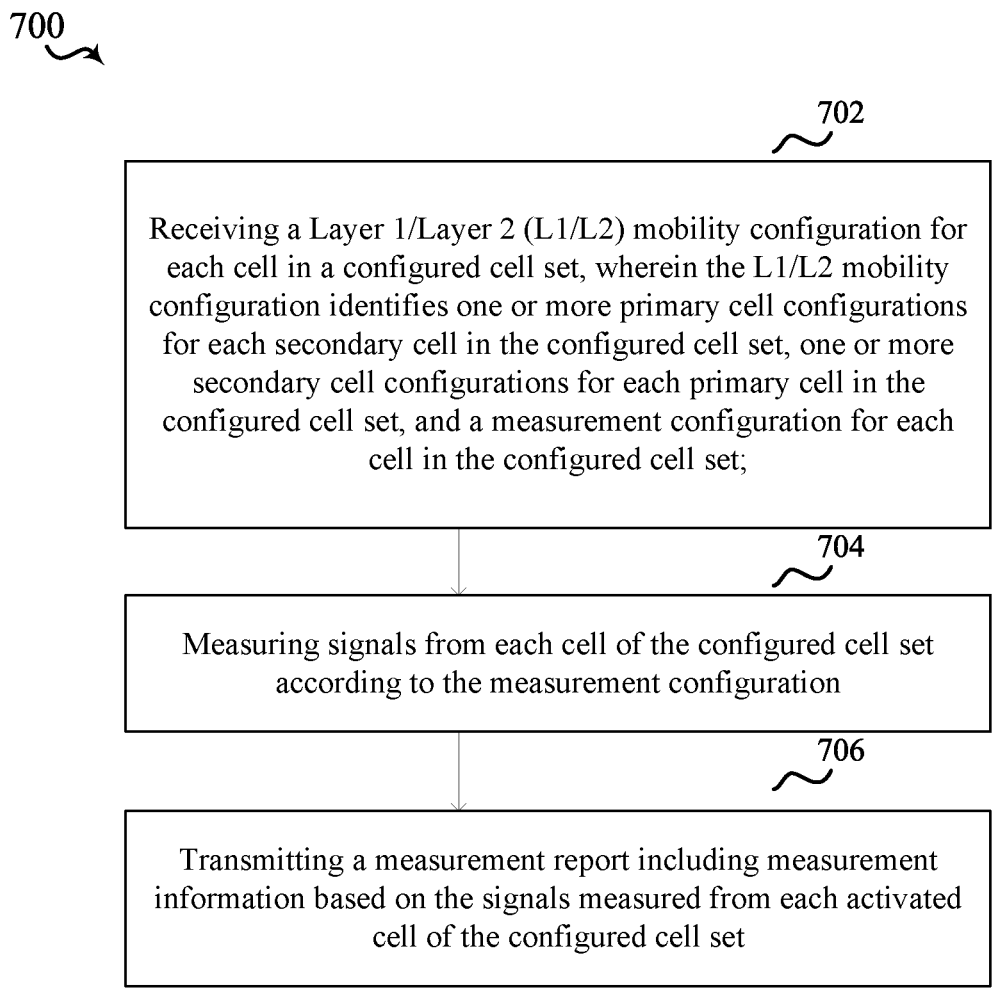
FIG. 7 is a flowchart of a method of wireless communication.

Referring to FIG. 6 and FIG. 7, in operation, UE 104 may perform a method 700 of wireless communication, by such as via execution of L1/L2 Configuration Component 198 by processor 605 and/or memory 360 (FIG. 3). In this case, the processor 605 may be the receive (rx) processor 356, the controller/processor 359, and/or the transmit (tx) processor 368 described above in FIG. 3.

At block 702, the method 700 includes receiving a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set. For example, in an aspect, UE 104, processor 605, memory 360, L1/L2 Configuration Component 198, and/or receiving component 620 may be configured to or may comprise means for receiving a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set.

For example, the receiving at block 702 may include receiving the L1/L2 mobility configuration via a wireless signal at an antenna or antenna array (e.g., antenna 352) as described in FIG. 3, and processing the received wireless signal and the L1/L2 mobility configuration as described above.

At block 704, the method 700 includes measuring signals from each cell of the configured cell set according to the measurement configuration. For example, in an aspect, UE 104, processor 605, memory 360, L1/L2 Configuration Component 198, and/or measuring component 625 may be configured to or may comprise means for measuring signals from each cell of the configured cell set according to the measurement configuration.

For example, the measuring at block 704 may include receiving one or more of the signals via one or more wireless signals at an antenna or antenna array (e.g., antenna 352) as described in FIG. 3, and performing channel quality or signal quality measurements to obtain measurement information on the received wireless signals as described in FIG. 3 and/or elsewhere above.

At block 706, the method 700 includes transmitting a measurement report including measurement information based on the signals measured from each activated cell of the configured cell set. For example, in an aspect, UE 104, processor 605, memory 360, L1/L2 Configuration Component 198, and/or transmitting component 630 may be configured to or may comprise means for transmitting a measurement report including measurement information based on the signals measured from each activated cell of the configured cell set.

For example, the transmitting at block 706 may include transmitting measurement report via a wireless signal at an antenna or antenna array (e.g., antenna 352) as described in FIG. 3.

Referring to FIG. 8, in an alternative or additional aspect, at block 802, the method 700 may further include receiving, via an L1/L2 message and based on the measurement report, an activation update configuration indicating at least one of a first cell of the configured cell set as being changed from a respective primary cell to a respective secondary cell, or a second cell of the configured cell set as being changed from a respective secondary cell to a respective primary cell. For example, in an aspect, UE 104, processor 605, memory 360, L1/L2 Configuration Component 198, and/or receiving component 620 may be configured to or may comprise means for receiving, via an L1/L2 message and based on the measurement report, an activation update configuration indicating at least one of a first cell of the configured cell set as being changed from a respective primary cell to a respective secondary cell, or a second cell of the configured cell set as being changed from a respective secondary cell to a respective primary cell.

For example, the receiving at block 802 may include receiving the activation update configuration via a wireless signal at an antenna or antenna array (e.g., antenna 352) as described in FIG. 3, and processes the wireless signal as described in FIG. 3.

In this optional aspect, at block 804, the method 700 may further include switching use of configuration information for communicating with the at least one of the first cell or the second cell based on the activation update configuration, including switching from use of a respective primary cell configuration for the first cell to a respective secondary cell configuration for the first cell, or switching from use of a respective secondary cell configuration for the second cell to a respective primary cell configuration for the second cell. For example, in an aspect, UE 104, processor 605, memory 360, L1/L2 Configuration Component 198, and/or switching component 640 may be configured to or may comprise means for switching use of configuration information for communicating with the at least one of the first cell or the second cell based on the activation update configuration, including switching from use of a respective primary cell configuration for the first cell to a respective secondary cell configuration for the first cell, or switching from use of a respective secondary cell configuration for the second cell to a respective primary cell configuration for the second cell.

For example, the switching at block 804 may be performed for the reasons described above.

In an alternative or additional aspect, the first cell and the second cell are part of an L1/L2 mobility activated cell set within an L1/L2 mobility configured cell set.

In an alternative or additional aspect, the L1/L2 message comprises a medium access control-control element (MAC-CE) or a downlink control information (DCI), and wherein the L1/L2 mobility configuration is received in a radio resource control (RRC) message.

Referring to FIG. 9, in an alternative or additional aspect wherein the configured cell set comprises an L1/L2 mobility configured cell set, at block 902, the measuring at block 704 of signals from each cell of the configured cell set includes measuring signals from deactivated cells within the L1/L2 mobility configured cell set For example, receiving one or more of the signals via one or more wireless signals at an antenna or antenna array (e.g., antenna 352) as described in FIG. 3, and processes the wireless signals as described in FIG. 3, and may be performed for the reasons as described above.

In an alternative or additional aspect, the L1/L2 mobility configuration identifies both the one or more primary cell configurations and the one or more secondary cell configurations for each cell in the configured cell set.

In an alternative or additional aspect, the one or more primary cell configurations for each secondary cell in the configured cell set comprises a special cell configuration for use when the secondary cell is identified as a primary cell of a master cell group or a secondary cell group, and wherein the L1/L2 mobility configuration identifies differential configuration parameters to add to the one or more secondary cell configurations to form the special cell configuration for each secondary cell in the configured cell set.

In an alternative or additional aspect, the L1/L2 mobility configuration identifies differential configuration parameters to disable from the one or more primary cell configurations to form the one or more secondary cell configurations for each primary cell in the configured cell set or to disable from the one or more secondary cell configurations to form the one or more primary cell configurations for each secondary cell in the configured cell set.

Referring to FIG. 10, in an alternative or additional aspect, at block 1002, the receiving at block 702 of the L1/L2 mobility configuration comprises receiving the L1/L2 mobility configuration within a serving cell configuration.

For example, the receiving at block 1002 may include receiving the L1/L2 mobility configuration via one or more wireless signals at an antenna or antenna array (e.g., antenna 352) as described in FIG. 3, and processing the wireless signals as described above.

In an alternative or additional aspect, wherein the configured cell set comprises a carrier aggregation configured cell set, the receiving of the L1/L2 mobility configuration comprises receiving the L1/L2 mobility configuration within a cell group configuration that identifies a plurality of cells as the carrier aggregation configured cell set, a first subset of the plurality of cells as a carrier aggregation activated cell set, a second subset of the plurality of cells as an L1/L2 mobility configured cell set, and a third subset of the plurality of cells as an L1/L2 mobility activated cell set.

Figure 11:
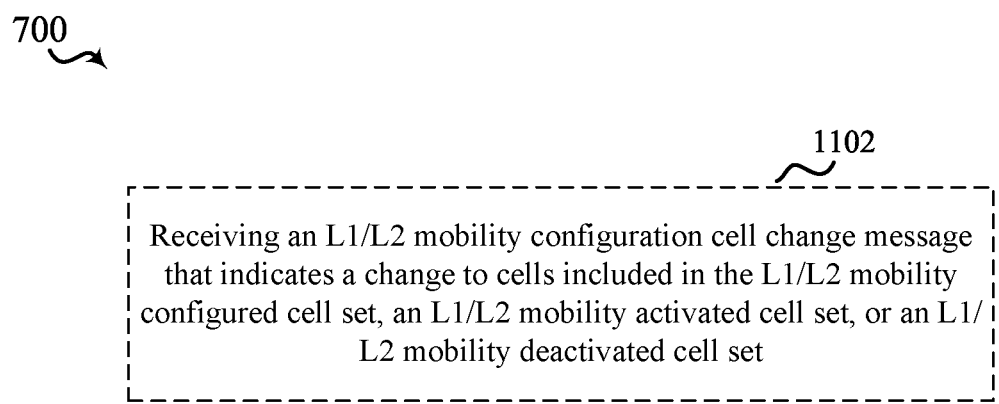
FIG. 11 is a flowchart of a method of wireless communication.

Referring to FIG. 11, in an alternative or additional aspect wherein the configured cell set comprises an L1/L2 mobility configured cell set, at block 1102, the method 700 may further include receiving an L1/L2 mobility configuration cell change message that indicates a change to cells included in the L1/L2 mobility configured cell set, an L1/L2 mobility activated cell set, or an L1/L2 mobility deactivated cell set. For example, in an aspect, UE 104, processor 605, memory 360, L1/L2 Configuration Component 198, and/or receiving component 620 may be configured to or may comprise means for receiving an L1/L2 mobility configuration cell change message that indicates a change to cells included in the L1/L2 mobility configured cell set, an L1/L2 mobility activated cell set, or an L1/L2 mobility deactivated cell set.

For example, the receiving at block 1102 may include receiving the L1/L2 mobility configuration cell change message via one or more wireless signals at an antenna or antenna array (e.g., antenna 352) as described in FIG. 3, and processing the wireless signals as described above.

Further, for example, the receiving at block 1102 may be performed for the reasons described above.

In an alternative or additional aspect, the L1/L2 mobility configuration cell change message includes an indicator in a serving cell configuration of at least one cell in a carrier aggregation configured cell set that includes the L1/L2 mobility configured cell set, wherein the indicator enables or disables inclusion of the at least one cell of the carrier aggregation configured cell set in the L1/L2 mobility configured cell set.

In an alternative or additional aspect, the L1/L2 mobility configuration cell change message includes an indicator in an index field in an L1/L2 mobility information element, wherein the index field corresponds to a cell in a carrier aggregation configured cell set that includes the configured cell set. In this aspect, the L1/L2 mobility information element includes a set of index fields corresponding to all configured secondary cells in the carrier aggregation configured cell set. In this aspect, the L1/L2 mobility information element includes a set of index fields corresponding to each of the secondary cells in the carrier aggregation configured cell set having the L1/L2 mobility configuration.

Referring to FIG. 12 and FIG. 13, in operation, network entity 102 may perform a method 1300 of wireless communication, by such as via execution of L1/L2 configuration component 199 by processor 1206 and/or memory 376 (FIG. 3). In this case, the processor 1206 may be the receive (rx) processor 370, the controller/processor 375, and/or the transmit (tx) processor 316 described above in FIG. 3.

At block 1302, the method 1300 includes transmitting, to a user equipment (UE), a Layer 1/Layer 2 (L1/L2) mobility configuration for each cell in a configured cell set, wherein the L1/L2 mobility configuration identifies a primary cell configuration for each secondary cell in the configured cell set, a secondary cell configuration for each primary cell in the configured cell set, and a measurement configuration for each cell in the configured cell set. For example, in an aspect, network entity 102, processor 1206, memory 376, L1/L2 configuration component 199, and/or transmitting component 1220 may be configured to or may comprise means for transmitting, to a user equipment (UE), a Layer 1/Layer 2 (L1/L2) mobility configuration for each cell in a configured cell set, wherein the L1/L2 mobility configuration identifies a primary cell configuration for each secondary cell in the configured cell set, a secondary cell configuration for each primary cell in the configured cell set, and a measurement configuration for each cell in the configured cell set.

For example, the transmitting at block 1302 may include transmitting the L1/L2 mobility configurations via one or more wireless signals transmitted using an antenna or an antenna array (e.g., antenna 320).

At block 1304, the method 1300 includes receiving a measurement report including measurement information based on signals measured by the UE from each activated cell of the configured cell set according to the measurement configuration. For example, in an aspect, network entity 102, processor 1206, memory 376, L1/L2 configuration component 199, and/or receiving component 1225 may be configured to or may comprise means for receiving a measurement report including measurement information based on signals measured by the UE from each activated cell of the configured cell set according to the measurement configuration.

For example, the receiving at block 1304 may include receiving the measurement report via one or more wireless signals at an antenna or an antenna array (e.g., antenna 320) as described in FIG. 3, and processes the wireless signals as described in FIG. 3.

At block 1306, the method 1300 includes generating, based on the measurement report, an activation update configuration indicating at least one of a first cell of the configured cell set as being changed from a respective primary cell to a respective secondary cell, or a second cell of the configured cell set as being changed from a respective secondary cell to a respective primary cell. For example, in an aspect, network entity 102, processor 1206, memory 376, L1/L2 configuration component 199, and/or generating component 1230 may be configured to or may comprise means for generating, based on the measurement report, an activation update configuration indicating at least one of a first cell of the configured cell set as being changed from a respective primary cell to a respective secondary cell, or a second cell of the configured cell set as being changed from a respective secondary cell to a respective primary cell.

For example, the generating at block 1306 may be performed for the reasons described above.

At block 1308, the method 1300 includes transmitting, via an L1/L2 message, the activation update configuration. For example, in an aspect, network entity 102, processor 1206, memory 376, L1/L2 configuration component 199, and/or transmitting component 1220 may be configured to or may comprise means for transmitting, via an L1/L2 message, the activation update configuration.

For example, the transmitting at block 1308 may include transmitting activation update configurations via one or more wireless signals transmitted using an antenna or an antenna array (e.g., antenna 320).

Referring to FIG. 14, in an alternative or additional aspect, at block 1202, the method 1300 may further include switching use of configuration information for communicating with the UE based on the activation update configuration, including switching from use of a respective primary cell configuration for the first cell to a respective secondary cell configuration for the first cell, or switching from use of a respective secondary cell configuration for the second cell to a respective primary cell configuration for the second cell. For example, in an aspect, network entity 102, processor 1206, memory 376, L1/L2 configuration component 199, and/or switching component 1235 may be configured to or may comprise means for switching use of configuration information for communicating with the UE based on the activation update configuration, including switching from use of a respective primary cell configuration for the first cell to a respective secondary cell configuration for the first cell, or switching from use of a respective secondary cell configuration for the second cell to a respective primary cell configuration for the second cell.

For example, the switching at block 1202 may be performed for the reasons as described above.

In an alternative or additional aspect, the first cell and the second cell are part of an L1/L2 mobility activated cell set within an L1/L2 mobility configured cell set.

In an alternative or additional aspect, the L1/L2 message comprises a medium access control-control element (MAC-CE) or a downlink control information (DCI), and wherein the L1/L2 mobility configuration is received in a radio resource control (RRC) message.

In an alternative or additional aspect, the configured cell set comprises an L1/L2 mobility configured cell set, and wherein the measurement information includes information of signals measured by the UE from deactivated cells within the L1/L2 mobility configured cell set.

In an alternative or additional aspect, the L1/L2 mobility configuration identifies both the one or more primary cell configurations and the one or more secondary cell configurations for each cell in the configured cell set.

In an alternative or additional aspect, the one or more primary cell configurations for each secondary cell in the configured cell set comprises a special cell configuration for use when the secondary cell is identified as a primary cell of a master cell group or a secondary cell group, and wherein the L1/L2 mobility configuration identifies differential configuration parameters to add to the one or more secondary cell configurations to form the special cell configuration for each secondary cell in the configured cell set.

In an alternative or additional aspect, the L1/L2 mobility configuration identifies differential configuration parameters to disable from the one or more primary cell configurations to form the one or more secondary cell configurations for each primary cell in the configured cell set or to disable from the one or more secondary cell configurations to form the one or more primary cell configurations for each secondary cell in the configured cell set.

In an alternative or additional aspect, the transmitting of the L1/L2 mobility configuration comprises transmitting the L1/L2 mobility configuration within a serving cell configuration.

In an alternative or additional aspect, wherein the configured cell set comprises a carrier aggregation configured cell set, wherein transmitting the L1/L2 mobility configuration comprises transmitting the L1/L2 mobility configuration within a cell group configuration that identifies a plurality of cells as the carrier aggregation configured cell set, a first subset of the plurality of cells as a carrier aggregation activated cell set, a second subset of the plurality of cells as an L1/L2 mobility configured cell set, and a third subset of the plurality of cells as an L1/L2 mobility activated cell set.

Figure 15:
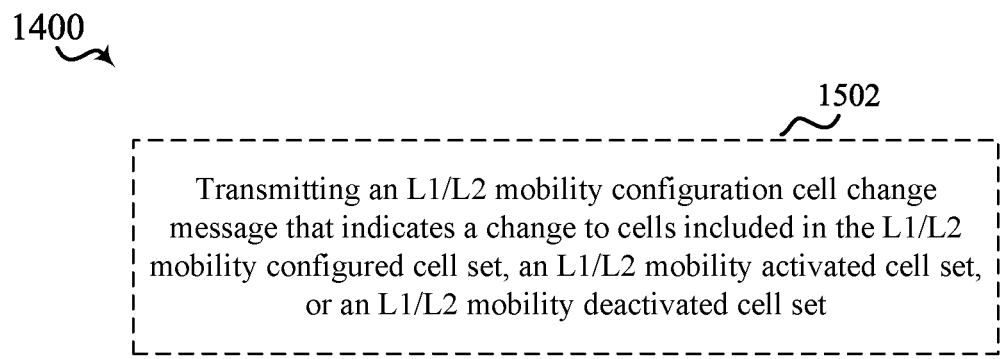
FIG. 15 is a flowchart of a method of wireless communication.

Referring to FIG. 15, in an alternative or additional aspect wherein the configured cell set comprises an L1/L2 mobility configured cell set, at block 1502, the method 1300 may further include transmitting an L1/L2 mobility configuration cell change message that indicates a change to cells included in the L1/L2 mobility configured cell set, an L1/L2 mobility activated cell set, or an L1/L2 mobility deactivated cell set. For example, in an aspect, network entity 102, processor 1206, memory 376, L1/L2 configuration component 199, and/or transmitting component 1120 may be configured to or may comprise means for transmitting an L1/L2 mobility configuration cell change message that indicates a change to cells included in the L1/L2 mobility configured cell set, an L1/L2 mobility activated cell set, or an L1/L2 mobility deactivated cell set.

For example, the transmitting at block 1502 may include transmitting the L1/L2 mobility configuration cell change message via one or more wireless signals transmitted using an antenna or an antenna array (e.g., antenna 320).

In an alternative or additional aspect, the L1/L2 mobility configuration cell change message includes an indicator in a serving cell configuration of at least one cell in a carrier aggregation configured cell set that includes the L1/L2 mobility configured cell set, wherein the indicator enables or disables inclusion of the at least one cell of the carrier aggregation configured cell set in the L1/L2 mobility configured cell set.

In an alternative or additional aspect, the L1/L2 mobility configuration cell change message includes an indicator in an index field in an L1/L2 mobility information element, wherein the index field corresponds to a cell in a carrier aggregation configured cell set that includes the configured cell set. In this aspect, the L1/L2 mobility information element includes a set of index fields corresponding to all configured secondary cells in the carrier aggregation configured cell set. In this aspect, the L1/L2 mobility information element includes a set of index fields corresponding to each of the secondary cells in the carrier aggregation configured cell set having the L1/L2 mobility configuration.

The following examples are illustrative only and may be combined with aspects of other embodiments or teachings described herein, without limitation.

1. A method of wireless communication by a user equipment, comprising:
receiving a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set; measuring signals from each cell of the configured cell set according to the measurement configuration; and
transmitting a measurement report including measurement information based on the signals measured from each activated cell of the configured cell set.

2. The method of clause 1, further comprising:
receiving, via an L1/L2 message and based on the measurement report, an activation update configuration indicating at least one of a first cell of the configured cell set as being changed from a respective primary cell to a respective secondary cell, or a second cell of the configured cell set as being changed from a respective secondary cell to a respective primary cell; and
switching use of configuration information for communicating with the at least one of the first cell or the second cell based on the activation update configuration, including switching from use of a respective primary cell configuration for the first cell to a respective secondary cell configuration for the first cell, or switching from use of a respective secondary cell configuration for the second cell to a respective primary cell configuration for the second cell.

3. The method of any of the preceding clauses, wherein the first cell and the second cell are part of an L1/L2 mobility activated cell set within an L1/L2 mobility configured cell set.

4. The method of any of the preceding clauses, wherein the L1/L2 message comprises a medium access control-control element (MAC-CE) or a downlink control information (DCI), and wherein the L1/L2 mobility configuration is received in a radio resource control (RRC) message.

5. The method of any of the preceding clauses, wherein the configured cell set comprises an L1/L2 mobility configured cell set, and wherein measuring signals from each cell of the configured cell set includes measuring signals from deactivated cells within the L1/L2 mobility configured cell set.

6. The method of any of the preceding clauses, wherein the L1/L2 mobility configuration identifies both the one or more primary cell configurations and the one or more secondary cell configurations for each cell in the configured cell set.

7. The method of any of the preceding clauses, wherein the one or more primary cell configurations for each secondary cell in the configured cell set comprises a special cell configuration for use when the secondary cell is identified as a primary cell of a master cell group or a secondary cell group, and wherein the L1/L2 mobility configuration identifies differential configuration parameters to add to the one or more secondary cell configurations to form the special cell configuration for each secondary cell in the configured cell set.

8. The method of any of the preceding clauses, wherein the L1/L2 mobility configuration identifies differential configuration parameters to disable from the one or more primary cell configurations to form the one or more secondary cell configurations for each primary cell in the configured cell set or to disable from the one or more secondary cell configurations to form the one or more primary cell configurations for each secondary cell in the configured cell set.

9. The method of any of the preceding clauses, wherein receiving the L1/L2 mobility configuration comprises receiving the L1/L2 mobility configuration within a serving cell configuration.

10. The method of any of the preceding clauses, wherein the configured cell set comprises a carrier aggregation configured cell set, wherein receiving the L1/L2 mobility configuration comprises receiving the L1/L2 mobility configuration within a cell group configuration that identifies a plurality of cells as the carrier aggregation configured cell set, a first subset of the plurality of cells as a carrier aggregation activated cell set, a second subset of the plurality of cells as an L1/L2 mobility configured cell set, and a third subset of the plurality of cells as an L1/L2 mobility activated cell set.

11. The method of any of the preceding clauses, wherein the configured cell set comprises an L1/L2 mobility configured cell set, and further comprising: receiving an L1/L2 mobility configuration cell change message that indicates a change to cells included in the L1/L2 mobility configured cell set, an L1/L2 mobility activated cell set, or an L1/L2 mobility deactivated cell set.

12. The method of any of the preceding clauses, wherein the L1/L2 mobility configuration cell change message includes an indicator in a serving cell configuration of at least one cell in a carrier aggregation configured cell set that includes the L1/L2 mobility configured cell set, wherein the indicator enables or disables inclusion of the at least one cell of the carrier aggregation configured cell set in the L1/L2 mobility configured cell set.

13. The method of any of the preceding clauses, wherein the L1/L2 mobility configuration cell change message includes an indicator in an index field in an L1/L2 mobility information element, wherein the index field corresponds to a cell in a carrier aggregation configured cell set that includes the configured cell set.

14. The method of any of the preceding clauses, wherein the L1/L2 mobility information element includes a set of index fields corresponding to all configured secondary cells in the carrier aggregation configured cell set.

15. The method of any of the preceding clauses, wherein the L1/L2 mobility information element includes a set of index fields corresponding to each of the secondary cells in the carrier aggregation configured cell set having the L1/L2 mobility configuration.

16. The method of any of the preceding clauses, further comprising:
switching use of configuration information for communicating with the UE based on the activation update configuration, including switching from use of a respective primary cell configuration for the first cell to a respective secondary cell configuration for the first cell, or switching from use of a respective secondary cell configuration for the second cell to a respective primary cell configuration for the second cell.

17. The method of any of the preceding clauses, wherein the first cell and the second cell are part of an L1/L2 mobility activated cell set within an L1/L2 mobility configured cell set.

18. The method of any of the preceding clauses, wherein the L1/L2 message comprises a medium access control-control element (MAC-CE) or a downlink control information (DCI), and wherein the L1/L2 mobility configuration is received in a radio resource control (RRC) message.

19. The method of any of the preceding clauses, wherein the L1/L2 mobility configuration identifies differential configuration parameters to disable from the one or more primary cell configurations to form the one or more secondary cell configurations for each primary cell in the configured cell set or to disable from the one or more secondary cell configurations to form the one or more primary cell configurations for each secondary cell in the configured cell set.

20. The method of any of the preceding clauses, wherein transmitting the L1/L2 mobility configuration comprises transmitting the L1/L2 mobility configuration within a serving cell configuration.

21. An apparatus for wireless communication by a user equipment, comprising:
a memory; and
a processor coupled with the memory and configured to:
receive a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set;
measure signals from each cell of the configured cell set according to the measurement configuration; and
transmit a measurement report including measurement information based on the signals measured from each activated cell of the configured cell set.

22. The apparatus of clause 21, wherein the processor is further configured to:
receive, via an L1/L2 message and based on the measurement report, an activation update configuration indicating at least one of a first cell of the configured cell set as being changed from a respective primary cell to a respective secondary cell, or a second cell of the configured cell set as being changed from a respective secondary cell to a respective primary cell; and
switch use of configuration information for communicating with the at least one of the first cell or the second cell based on the activation update configuration, including switching from use of a respective primary cell configuration for the first cell to a respective secondary cell configuration for the first cell, or switching from use of a respective secondary cell configuration for the second cell to a respective primary cell configuration for the second cell.

23. The apparatus of any of the preceding clauses, wherein the first cell and the second cell are part of an L1/L2 mobility activated cell set within an L1/L2 mobility configured cell set.

24. The apparatus of any of the preceding clauses, wherein the L1/L2 message comprises a medium access control-control element (MAC-CE) or a downlink control information (DCI), and wherein the L1/L2 mobility configuration is received in a radio resource control (RRC) message.

25. The apparatus of any of the preceding clauses, wherein the configured cell set comprises an L1/L2 mobility configured cell set, and wherein to measure signals from each cell of the configured cell set includes to measure signals from deactivated cells within the L1/L2 mobility configured cell set.

26. The apparatus of any of the preceding clauses, wherein the L1/L2 mobility configuration identifies both the one or more primary cell configurations and the one or more secondary cell configurations for each cell in the configured cell set.

27. The apparatus of any of the preceding clauses, wherein the one or more primary cell configurations for each secondary cell in the configured cell set comprises a special cell configuration for use when the secondary cell is identified as a primary cell of a master cell group or a secondary cell group, and wherein the L1/L2 mobility configuration identifies differential configuration parameters to add to the one or more secondary cell configurations to form the special cell configuration for each secondary cell in the configured cell set.

28. The apparatus of any of the preceding clauses, wherein the L1/L2 mobility configuration identifies differential configuration parameters to disable from the one or more primary cell configurations to form the one or more secondary cell configurations for each primary cell in the configured cell set or to disable from the one or more secondary cell configurations to form the one or more primary cell configurations for each secondary cell in the configured cell set.

29. The apparatus of any of the preceding clauses, wherein to receive the L1/L2 mobility configuration comprises to receive the L1/L2 mobility configuration within a serving cell configuration.

30. The apparatus of any of the preceding clauses, wherein the configured cell set comprises a carrier aggregation configured cell set, wherein to receive the L1/L2 mobility configuration comprises to receive the L1/L2 mobility configuration within a cell group configuration that identifies a plurality of cells as the carrier aggregation configured cell set, a first subset of the plurality of cells as a carrier aggregation activated cell set, a second subset of the plurality of cells as an L1/L2 mobility configured cell set, and a third subset of the plurality of cells as an L1/L2 mobility activated cell set.

31. The apparatus of any of the preceding clauses, wherein the configured cell set comprises an L1/L2 mobility configured cell set, and wherein the processor is further configured to:
receive an L1/L2 mobility configuration cell change message that indicates a change to cells included in the L1/L2 mobility configured cell set, an L1/L2 mobility activated cell set, or an L1/L2 mobility deactivated cell set.

32. The apparatus of any of the preceding clauses, wherein the L1/L2 mobility configuration cell change message includes an indicator in a serving cell configuration of at least one cell in a carrier aggregation configured cell set that includes the L1/L2 mobility configured cell set, wherein the indicator enables or disables inclusion of the at least one cell of the carrier aggregation configured cell set in the L1/L2 mobility configured cell set.

33. The apparatus of any of the preceding clauses, wherein the L1/L2 mobility configuration cell change message includes an indicator in an index field in an L1/L2 mobility information element, wherein the index field corresponds to a cell in a carrier aggregation configured cell set that includes the configured cell set.

34. The apparatus of any of the preceding clauses, wherein the L1/L2 mobility information element includes a set of index fields corresponding to all configured secondary cells in the carrier aggregation configured cell set.

35. The apparatus of any of the preceding clauses, wherein the L1/L2 mobility information element includes a set of index fields corresponding to each of the secondary cells in the carrier aggregation configured cell set having the L1/L2 mobility configuration.

36. The apparatus of any of the preceding clauses, wherein the processor is further configured to:
switch use of configuration information for communicating with the UE based on the activation update configuration, including switching from use of a respective primary cell configuration for the first cell to a respective secondary cell configuration for the first cell, or switching from use of a respective secondary cell configuration for the second cell to a respective primary cell configuration for the second cell.

37. The apparatus of any of the preceding clauses, wherein the first cell and the second cell are part of an L1/L2 mobility activated cell set within an L1/L2 mobility configured cell set.

38. The apparatus of any of the preceding clauses, wherein the L1/L2 message comprises a medium access control-control element (MAC-CE) or a downlink control information (DCI), and wherein the L1/L2 mobility configuration is received in a radio resource control (RRC) message.

39. The apparatus of any of the preceding clauses, wherein the L1/L2 mobility configuration identifies differential configuration parameters to disable from the one or more primary cell configurations to form the one or more secondary cell configurations for each primary cell in the configured cell set or to disable from the one or more secondary cell configurations to form the one or more primary cell configurations for each secondary cell in the configured cell set.

40. The apparatus of any of the preceding clauses, wherein to transmit the L1/L2 mobility configuration comprises to transmit the L1/L2 mobility configuration within a serving cell configuration.

41. A method of wireless communication by a network entity, comprising:
transmitting, to a user equipment (UE), a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set;
receiving a measurement report including measurement information based on signals measured by the UE from each activated cell of the configured cell set according to the measurement configuration;
generating, based on the measurement report, an activation update configuration indicating at least one of a first cell of the configured cell set as being changed from a respective primary cell to a respective secondary cell, or a second cell of the configured cell set as being changed from a respective secondary cell to a respective primary cell; and
transmitting, via an L1/L2 message, the activation update configuration.

42. The method of clause 41, wherein the configured cell set comprises an L1/L2 mobility configured cell set, and wherein the measurement information includes information of signals measured by the UE from deactivated cells within the L1/L2 mobility configured cell set.

43. The method of any of the preceding clauses, wherein the L1/L2 mobility configuration identifies both the one or more primary cell configurations and the one or more secondary cell configurations for each cell in the configured cell set.

44. The method of any of the preceding clauses, wherein the one or more primary cell configurations for each secondary cell in the configured cell set comprises a special cell configuration for use when the secondary cell is identified as a primary cell of a master cell group or a secondary cell group, and wherein the L1/L2 mobility configuration identifies differential configuration parameters to add to the one or more secondary cell configurations to form the special cell configuration for each secondary cell in the configured cell set.

45. The method of any of the preceding clauses, wherein the configured cell set comprises a carrier aggregation configured cell set, wherein transmitting the L1/L2 mobility configuration comprises transmitting the L1/L2 mobility configuration within a cell group configuration that identifies a plurality of cells as the carrier aggregation configured cell set, a first subset of the plurality of cells as a carrier aggregation activated cell set, a second subset of the plurality of cells as an L1/L2 mobility configured cell set, and a third subset of the plurality of cells as an L1/L2 mobility activated cell set.

46. The method of any of the preceding clauses, wherein the configured cell set comprises an L1/L2 mobility configured cell set, and further comprising: transmitting an L1/L2 mobility configuration cell change message that indicates a change to cells included in the L1/L2 mobility configured cell set, an L1/L2 mobility activated cell set, or an L1/L2 mobility deactivated cell set.

47. The method of any of the preceding clauses, wherein the L1/L2 mobility configuration cell change message includes an indicator in a serving cell configuration of at least one cell in a carrier aggregation configured cell set that includes the L1/L2 mobility configured cell set, wherein the indicator enables or disables inclusion of the at least one cell of the carrier aggregation configured cell set in the L1/L2 mobility configured cell set.

48. The method of any of the preceding clauses, wherein the L1/L2 mobility configuration cell change message includes an indicator in an index field in an L1/L2 mobility information element, wherein the index field corresponds to a cell in a carrier aggregation configured cell set that includes the configured cell set.

49. The method of any of the preceding clauses, wherein the L1/L2 mobility information element includes a set of index fields corresponding to all configured secondary cells in the carrier aggregation configured cell set.

50. The method of any of the preceding clauses, wherein the L1/L2 mobility information element includes a set of index fields corresponding to each of the secondary cells in the carrier aggregation configured cell set having the L1/L2 mobility configuration.

51. An apparatus for wireless communication by a network entity, comprising:
a memory; and
a processor coupled with the memory and configured to:
transmit, to a user equipment (UE), a Layer 1/Layer 2 (L1/L2) mobility configuration for each cell in a configured cell set, wherein the L1/L2 mobility configuration identifies a primary cell configuration for each secondary cell in the configured cell set, a secondary cell configuration for each primary cell in the configured cell set, and a measurement configuration for each cell in the configured cell set;
receive a measurement report including measurement information based on signals measured by the UE from each activated cell of the configured cell set according to the measurement configuration;
generate, based on the measurement report, an activation update configuration indicating at least one of a first cell of the configured cell set as being changed from a respective primary cell to a respective secondary cell, or a second cell of the configured cell set as being changed from a respective secondary cell to a respective primary cell; and
transmit, via an L1/L2 message, the activation update configuration.

52. The apparatus of clause 51, wherein the configured cell set comprises an L1/L2 mobility configured cell set, and wherein the measurement information includes information of signals measured by the UE from deactivated cells within the L1/L2 mobility configured cell set.

53. The apparatus of any of the preceding clauses, wherein the L1/L2 mobility configuration identifies both the one or more primary cell configurations and the one or more secondary cell configurations for each cell in the configured cell set.

54. The apparatus of any of the preceding clauses, wherein the one or more primary cell configurations for each secondary cell in the configured cell set comprises a special cell configuration for use when the secondary cell is identified as a primary cell of a master cell group or a secondary cell group, and wherein the L1/L2 mobility configuration identifies differential configuration parameters to add to the one or more secondary cell configurations to form the special cell configuration for each secondary cell in the configured cell set.

55. The apparatus of any of the preceding clauses, wherein the configured cell set comprises a carrier aggregation configured cell set, wherein to transmit the L1/L2 mobility configuration comprises to transmit the L1/L2 mobility configuration within a cell group configuration that identifies a plurality of cells as the carrier aggregation configured cell set, a first subset of the plurality of cells as a carrier aggregation activated cell set, a second subset of the plurality of cells as an L1/L2 mobility configured cell set, and a third subset of the plurality of cells as an L1/L2 mobility activated cell set.

56. The apparatus of any of the preceding clauses, wherein the configured cell set comprises an L1/L2 mobility configured cell set, and wherein the processor is further configured to:
transmit an L1/L2 mobility configuration cell change message that indicates a change to cells included in the L1/L2 mobility configured cell set, an L1/L2 mobility activated cell set, or an L1/L2 mobility deactivated cell set.

57. The apparatus of any of the preceding clauses, wherein the L1/L2 mobility configuration cell change message includes an indicator in a serving cell configuration of at least one cell in a carrier aggregation configured cell set that includes the L1/L2 mobility configured cell set, wherein the indicator enables or disables inclusion of the at least one cell of the carrier aggregation configured cell set in the L1/L2 mobility configured cell set.

58. The apparatus of any of the preceding clauses, wherein the L1/L2 mobility configuration cell change message includes an indicator in an index field in an L1/L2 mobility information element, wherein the index field corresponds to a cell in a carrier aggregation configured cell set that includes the configured cell set.

59. The apparatus of any of the preceding clauses, wherein the L1/L2 mobility information element includes a set of index fields corresponding to all configured secondary cells in the carrier aggregation configured cell set.

60. The apparatus of any of the preceding clauses, wherein the L1/L2 mobility information element includes a set of index fields corresponding to each of the secondary cells in the carrier aggregation configured cell set having the L1/L2 mobility configuration.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment, comprising:
receiving a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set;
measuring signals from each cell of the configured cell set according to the measurement configuration; and
transmitting a measurement report including measurement information based on the signals measured from each activated cell of the configured cell set.

2. The method of claim 1, further comprising:
receiving, via an L1/L2 message and based on the measurement report, an activation update configuration indicating at least one of a first cell of the configured cell set as being changed from a respective primary cell to a respective secondary cell, or a second cell of the configured cell set as being changed from a respective secondary cell to a respective primary cell; and
switching use of configuration information for communicating with the at least one of the first cell or the second cell based on the activation update configuration, including switching from use of a respective primary cell configuration for the first cell to a respective secondary cell configuration for the first cell, or switching from use of a respective secondary cell configuration for the second cell to a respective primary cell configuration for the second cell.

3. The method of claim 2, wherein the L1/L2 message comprises a medium access control-control element (MAC-CE) or a downlink control information (DCI), and wherein the L1/L2 mobility configuration is received in a radio resource control (RRC) message.

4. The method of claim 1, wherein the configured cell set comprises an L1/L2 mobility configured cell set, and wherein measuring signals from each cell of the configured cell set includes measuring signals from deactivated cells within the L1/L2 mobility configured cell set.

5. The method of claim 1, wherein the one or more primary cell configurations for each secondary cell in the configured cell set comprises a special cell configuration for use when the secondary cell is identified as a primary cell of a master cell group or a secondary cell group, and wherein the L1/L2 mobility configuration identifies differential configuration parameters to add to the one or more secondary cell configurations to form the special cell configuration for each secondary cell in the configured cell set.

6. The method of claim 1, wherein the L1/L2 mobility configuration identifies differential configuration parameters to disable from the one or more primary cell configurations to form the one or more secondary cell configurations for each primary cell in the configured cell set, or to disable from the one or more secondary cell configurations to form the one or more primary cell configurations for each secondary cell in the configured cell set.

7. The method of claim 1, wherein the configured cell set comprises an L1/L2 mobility configured cell set, and further comprising:
receiving an L1/L2 mobility configuration cell change message that indicates a change to cells included in the L1/L2 mobility configured cell set, an L1/L2 mobility activated cell set, or an L1/L2 mobility deactivated cell set.

8. The method of claim 7, wherein the L1/L2 mobility configuration cell change message includes an indicator in a serving cell configuration of at least one cell in a carrier aggregation configured cell set that includes the L1/L2 mobility configured cell set, wherein the indicator enables or disables inclusion of the at least one cell of the carrier aggregation configured cell set in the L1/L2 mobility configured cell set.

9. The method of claim 7, wherein the L1/L2 mobility configuration cell change message includes an indicator in an index field in an L1/L2 mobility information element, wherein the index field corresponds to a cell in a carrier aggregation configured cell set that includes the configured cell set.

10. The method of claim 9, wherein the L1/L2 mobility information element includes a first set of index fields corresponding to all configured secondary cells in the carrier aggregation configured cell set, or wherein the L1/L2 mobility information element includes a second set of index fields corresponding to each of the secondary cells in the carrier aggregation configured cell set having the L1/L2 mobility configuration.

11. An apparatus for wireless communication by a user equipment, comprising:
a memory; and
a processor coupled with the memory and configured to:
receive a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set;
measure signals from each cell of the configured cell set according to the measurement configuration; and
transmit a measurement report including measurement information based on the signals measured from each activated cell of the configured cell set.

12. The apparatus of claim 11, wherein the processor is further configured to:
receive, via an L1/L2 message and based on the measurement report, an activation update configuration indicating at least one of a first cell of the configured cell set as being changed from a respective primary cell to a respective secondary cell, or a second cell of the configured cell set as being changed from a respective secondary cell to a respective primary cell; and switch use of configuration information for communicating with the at least one of the first cell or the second cell based on the activation update configuration, including switching from use of a respective primary cell configuration for the first cell to a respective secondary cell configuration for the first cell, or switching from use of a respective secondary cell configuration for the second cell to a respective primary cell configuration for the second cell.

13. The apparatus of claim 12, wherein the L1/L2 message comprises a medium access control-control element (MAC-CE) or a downlink control information (DCI), and wherein the L1/L2 mobility configuration is received in a radio resource control (RRC) message.

14. The apparatus of claim 11, wherein the configured cell set comprises an L1/L2 mobility configured cell set, and wherein to measure signals from each cell of the configured cell set includes to measure signals from deactivated cells within the L1/L2 mobility configured cell set.

15. The apparatus of claim 11, wherein the one or more primary cell configurations for each secondary cell in the configured cell set comprises a special cell configuration for use when the secondary cell is identified as a primary cell of a master cell group or a secondary cell group, and wherein the L1/L2 mobility configuration identifies differential configuration parameters to add to the one or more secondary cell configurations to form the special cell configuration for each secondary cell in the configured cell set.

16. The apparatus of claim 11, wherein the L1/L2 mobility configuration identifies differential configuration parameters to disable from the one or more primary cell configurations to form the one or more secondary cell configurations for each primary cell in the configured cell set or to disable from the one or more secondary cell configurations to form the one or more primary cell configurations for each secondary cell in the configured cell set.

17. The apparatus of claim 11, wherein the configured cell set comprises an L1/L2 mobility configured cell set, and wherein the processor is further configured to:

receive an L1/L2 mobility configuration cell change message that indicates a change to cells included in the L1/L2 mobility configured cell set, an L1/L2 mobility activated cell set, or an L1/L2 mobility deactivated cell set.

18. The apparatus of claim 17, wherein the L1/L2 mobility configuration cell change message includes an indicator in a serving cell configuration of at least one cell in a carrier aggregation configured cell set that includes the L1/L2 mobility configured cell set, wherein the indicator enables or disables inclusion of the at least one cell of the carrier aggregation configured cell set in the L1/L2 mobility configured cell set.

19. The apparatus of claim 17, wherein the L1/L2 mobility configuration cell change message includes an indicator in an index field in an L1/L2 mobility information element, wherein the index field corresponds to a cell in a carrier aggregation configured cell set that includes the configured cell set.

20. The apparatus of claim 19, wherein the L1/L2 mobility information element includes a first set of index fields corresponding to all configured secondary cells in the carrier aggregation configured cell set, or wherein the L1/L2 mobility information element includes a second set of index fields corresponding to each of the secondary cells in the carrier aggregation configured cell set having the L1/L2 mobility configuration.

21. A method of wireless communication by a network entity, comprising:

transmitting, to a user equipment (UE), a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set;

receiving a measurement report including measurement information based on signals measured by the UE from each activated cell of the configured cell set according to the measurement configuration;

generating, based on the measurement report, an activation update configuration indicating at least one of a first cell of the configured cell set as being changed from a respective primary cell to a respective secondary cell, or a second cell of the configured cell set as being changed from a respective secondary cell to a respective primary cell; and transmitting, via an L1/L2 message, the activation update configuration.

22. The method of claim 21, wherein the one or more primary cell configurations for each secondary cell in the configured cell set comprises a special cell configuration for use when the secondary cell is identified as a primary cell of a master cell group or a secondary cell group, and wherein the L1/L2 mobility configuration identifies differential configuration parameters to add to the one or more secondary cell configurations to form the special cell configuration for each secondary cell in the configured cell set.

23. The method of claim 21, wherein the configured cell set comprises an L1/L2 mobility configured cell set, and further comprising:

transmitting an L1/L2 mobility configuration cell change message that indicates a change to cells included in the L1/L2 mobility configured cell set, an L1/L2 mobility activated cell set, or an L1/L2 mobility deactivated cell set.

24. The method of claim 23, wherein the L1/L2 mobility configuration cell change message includes an indicator in a serving cell configuration of at least one cell in a carrier aggregation configured cell set that includes the L1/L2 mobility configured cell set, wherein the indicator enables or disables inclusion of the at least one cell of the carrier aggregation configured cell set in the L1/L2 mobility configured cell set, or an indicator in an index field in an L1/L2 mobility information element, wherein the index field corresponds to a cell in a carrier aggregation configured cell set that includes the configured cell set.

25. An apparatus for wireless communication by a network entity, comprising:

a memory; and a processor coupled with the memory and configured to:

transmit, to a user equipment (UE), a Layer 1/Layer 2 (L1/L2) mobility configuration for each cell in a configured cell set, wherein the L1/L2 mobility configuration identifies one or more primary cell configurations for each secondary cell in the configured cell set, one or more secondary cell configurations for each primary cell in the configured cell set, and a measurement configuration for each cell in the configured cell set;

receive a measurement report including measurement information based on signals measured by the UE from each activated cell of the configured cell set according to the measurement configuration;

generate, based on the measurement report, an activation update configuration indicating at least one of a first cell of the configured cell set as being changed from a respective primary cell to a respective secondary cell, or a second cell of the configured cell set as being changed from a respective secondary cell to a respective primary cell; and transmit, via an L1/L2 message, the activation update configuration.

26. The apparatus of claim 25, wherein the configured cell set comprises an L1/L2 mobility configured cell set, and wherein the measurement information includes information of signals measured by the UE from deactivated cells within the L1/L2 mobility configured cell set.

27. The apparatus of claim 25, wherein the one or more primary cell configurations for each secondary cell in the configured cell set comprises a special cell configuration for use when the secondary cell is identified as a primary cell of a master cell group or a secondary cell group, and wherein the L1/L2 mobility configuration identifies differential configuration parameters to add to the one or more secondary cell configurations to form the special cell configuration for each secondary cell in the configured cell set.

28. The apparatus of claim 25, wherein the configured cell set comprises an L1/L2 mobility configured cell set, and wherein the processor is further configured to:

transmit an L1/L2 mobility configuration cell change message that indicates a change to cells included in the L1/L2 mobility configured cell set, an L1/L2 mobility activated cell set, or an L1/L2 mobility deactivated cell set.

29. The apparatus of claim 28, wherein the L1/L2 mobility configuration cell change message includes an indicator in a serving cell configuration of at least one cell in a carrier aggregation configured cell set that includes the L1/L2 mobility configured cell set, wherein the indicator enables or disables inclusion of the at least one cell of the carrier aggregation configured cell set in the L1/L2 mobility configured cell set, or an indicator in an index field in an L1/L2 mobility information element, wherein the index field corresponds to a cell in a carrier aggregation configured cell set that includes the configured cell set.

30. The apparatus of claim 29, wherein the L1/L2 mobility information element includes a first set of index fields corresponding to all configured secondary cells in the carrier aggregation configured cell set, or wherein the L1/L2 mobility information element includes a second set of index fields corresponding to each of the secondary cells in the carrier aggregation configured cell set having the L1/L2 mobility configuration.

* * * * *